US009442664B2

(12) United States Patent
Dain et al.

(10) Patent No.: US 9,442,664 B2
(45) Date of Patent: Sep. 13, 2016

(54) EFFICIENT FLASHCOPY BACKUP TARGET VOLUME ALLOCATION FROM A SHARED RESOURCE POOL

(71) Applicant: INTERNATIONAL BUSINESS MACHINES CORPORATION, Armonk, NY (US)

(72) Inventors: Joseph W. Dain, Vail, AZ (US); Gregory T. Kishi, Oro Valley, AZ (US); Osnat Shasha, Holon (IL); Christopher Zaremba, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 14/243,440

(22) Filed: Apr. 2, 2014

(65) Prior Publication Data

US 2015/0286432 A1    Oct. 8, 2015

(51) Int. Cl.
*G06F 11/14* (2006.01)
*G06F 3/06* (2006.01)

(52) U.S. Cl.
CPC ............. *G06F 3/0619* (2013.01); *G06F 3/065* (2013.01); *G06F 3/0655* (2013.01); *G06F 3/0665* (2013.01); *G06F 3/0688* (2013.01); *G06F 3/0689* (2013.01); *G06F 11/1466* (2013.01)

(58) Field of Classification Search
None
See application file for complete search history.

(56) References Cited

U.S. PATENT DOCUMENTS 6,281,886 B1 * 8/2001 Ranieri ............... G06F 3/04886 345/171
7,069,401 B1 * 6/2006 Noonan ............... G06F 11/1461 707/999.202
7,941,621 B1 * 5/2011 Gipp .................. G06F 11/1456 711/162
2003/0149736 A1 * 8/2003 Berkowitz ............ G06F 3/0601 709/213
2008/0162662 A1 * 7/2008 Fujita .................. G06F 11/1464 709/214
2009/0106255 A1 * 4/2009 Lacapra .............. G06F 11/1076
2010/0042802 A1 * 2/2010 Helman ................ G06F 3/0605 711/173
2012/0259815 A1 * 10/2012 Olson ................. G06F 11/1458 707/649
2013/0080695 A1   3/2013 Beeken (Continued)

FOREIGN PATENT DOCUMENTS

CN           1873622 A     12/2006
CN         102981931 A      3/2013
CN         103678045 A      3/2014

OTHER PUBLICATIONS

Tate et al. IBM System Storage SAN Volume Controller and Storwize V7000 Replication Family Services. Mar. 2013. IBM. pp. 151-273.*

(Continued)

*Primary Examiner* — Nathan Sadler
(74) *Attorney, Agent, or Firm* — Griffiths & Seaton PLLC

(57) ABSTRACT

For efficient FlashCopy backup target volume allocation from a shared resource pool while ingesting a FlashCopy backup in a repository, for dynamically allocating a target volume for the new FlashCopy backup, a global pool of FlashCopy backup target volumes and a consistency group in the global pool of FlashCopy backup target volumes is maintained for use by a new FlashCopy backup upon encountering a collision while an existing FlashCopy target volume containing older FlashCopy backups are being ingested into the repository for dynamically allocating a target volume for the new FlashCopy backup.

17 Claims, 15 Drawing Sheets

(56) References Cited

U.S. PATENT DOCUMENTS

| | | | |
|---|---|---|---|
| 2013/0080704 A1* | 3/2013 | Brown | G06F 3/0608 |
| | | | 711/118 |
| 2013/0166568 A1* | 6/2013 | Binkert | G06F 17/30911 |
| | | | 707/741 |
| 2013/0205093 A1 | 8/2013 | Brown et al. | |
| 2013/0339297 A1 | 12/2013 | Chen | |
| 2013/0339302 A1 | 12/2013 | Zhang et al. | |
| 2013/0339303 A1 | 12/2013 | Potter et al. | |
| 2013/0339319 A1 | 12/2013 | Woodward et al. | |
| 2013/0339643 A1* | 12/2013 | Tekade | G06F 17/30581 |
| | | | 711/162 |
| 2015/0143064 A1* | 5/2015 | Bhargava | G06F 11/1451 |
| | | | 711/162 |

OTHER PUBLICATIONS

International Search Report, International Patent Application No. PCT/IB2015/051586, filed Mar. 4, 2015 (10 pages).

Dain et al., "System Storage: Dynamic Volume Allocation Management," IBM Confidential, Oct. 2013 (14 pages).

Lovelace et al., "DFSMShsm Fast Replication Technical Guide," ibm.com/redbooks, Second Edition, Chapters 1, 2 & 8, Oct. 2011 (284 pages).

Burger et al., "IBM System Storage D58000 Series: IBM FlashCopy SE," ibm.com/redbooks, First Edition, Chapters 2, 4 & 5, Feb. 2008 (80 pages).

* cited by examiner

EFFICIENT FLASHCOPY BACKUP TARGET VOLUME ALLOCATION FROM A SHARED RESOURCE POOL

BACKGROUND OF THE INVENTION

1. Field of the Invention

The present invention relates in general computing systems, and more particularly to, systems and methods for efficient FlashCopy backup target volume allocation from a shared resource pool.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Moreover, data, data files, and/or data records are also required to be stored, retained, and/or saved for various periods of time for subsequent retrieval and/or use. Efficiently storing and/or recycling the data, data files, and/or data records data is a key problem to solve, and therefore, a need exists to improve the data storage utilization and recycling.

SUMMARY OF THE INVENTION

In one embodiment, a method is provided for efficient FlashCopy backup target volume allocation from a shared resource pool while ingesting a FlashCopy backup in a repository using a processor device in a computing environment. In one embodiment, by way of example only, a global pool of FlashCopy backup target volumes and a consistency group in the global pool of FlashCopy backup target volumes is maintained for use by a new FlashCopy backup upon encountering a collision while an existing FlashCopy target volume containing older FlashCopy backups are being ingested into the repository for dynamically allocating a target volume for the new FlashCopy backup.

In another embodiment, a computer system is provided for efficient FlashCopy backup target volume allocation from a shared resource pool while ingesting a FlashCopy backup in a repository using a processor device, in a computing environment. The computer system includes a computer-readable medium and a processor in operable communication with the computer-readable medium. In one embodiment, by way of example only, the processor maintains a global pool of FlashCopy backup target volumes and a consistency group in the global pool of FlashCopy backup target volumes for use by a new FlashCopy backup upon encountering a collision while an existing FlashCopy target volume containing older FlashCopy backups are being ingested into the repository for dynamically allocating a target volume for the new FlashCopy backup.

In a further embodiment, a computer program product is provided for efficient FlashCopy backup target volume allocation from a shared resource pool while ingesting a FlashCopy backup in a repository using a processor device, in a computing environment. The computer-readable storage medium has computer-readable program code portions stored thereon. The computer-readable program code portions include a first executable portion that maintains a global pool of FlashCopy backup target volumes and a consistency group in the global pool of FlashCopy backup target volumes for use by a new FlashCopy backup upon encountering a collision while an existing FlashCopy target volume containing older FlashCopy backups are being ingested into the repository for dynamically allocating a target volume for the new FlashCopy backup.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
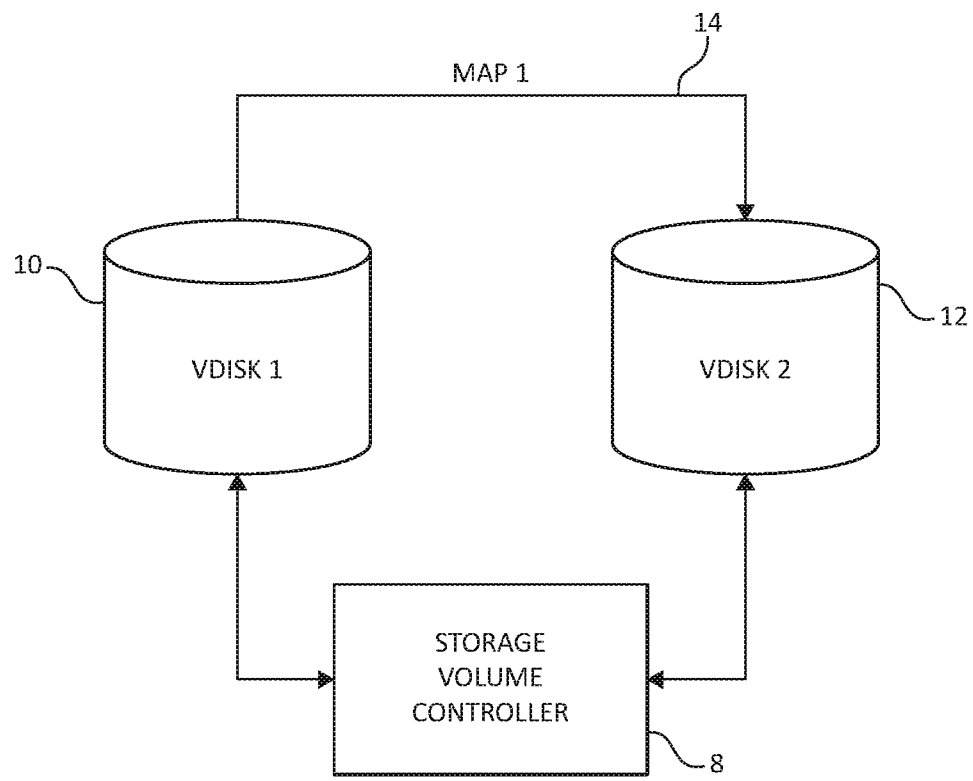
FIG. 1 is a block diagram illustrating a computing system environment having a pair of storage disks in which aspects of the present invention may be realized.

Storage area network (SAN) is an architecture that is often used when very large amounts of data are to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

A FlashCopy® function may be used for creating data redundancy. A FlashCopy® is a feature supported on various storage devices that allows a user or an automated process to make nearly instantaneous copies of entire logical volumes of data. A copy of a source disk is made on a target disk. The copies are immediately available for both read and write access. A feature of FlashCopy® like implementations is the ability to reverse the copy. That is, to populate the source disk of a FlashCopy® map with the contents of the target disk. With cascaded implementations, in which a target disk later becomes the source disk for a further FlashCopy®, this feature is complicated by the fact that the "grains" of data presented by a disk are located on a number of target/source disks "upstream" of the disk itself. This means that in order for a disk to maintain the image it is presenting, it must have access to all the disks containing these grains of data.

As mentioned, the FlashCopy® function may be used for creating data redundancy. For example, the FlashCopy® function enables an administrator to make point-in-time, full volume copies of data, with the copies immediately available for read or write access. (FlashCopy is a registered trademark of International Business Machines Corporation in the United States and other countries.) The FlashCopy® can be used with standard backup tools that are available in the environment to create backup copies on tape. A FlashCopy® function creates a copy of a source volume on a target volume. This copy, as mentioned above, is called a point-in-time (PIT) copy. When a FlashCopy® operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy® operation is initiated until the storage unit copies all data from the source volume to the target volume, or the relationship is deleted.

FlashCopy is often used for creating recovery points that are application consistent point in time copies of the production data. These recovery points can then be used in the event of production data corruption. Because the production system is often of limited usefulness when data corruption, occurs, the user frequently needs to be able to restore the production data immediately. Additionally users typically do not want to sacrifice any existing backups because restoring the production system may need to be re-triggered if mistakes are made when recovering the system. When the data is physically copied, a background process copies tracks from the source volume to the target volume. The amount of time that it takes to complete the background copy depends on various criteria, such as the amount of data being copied, the number of background copy processes that are running and any other activities that are presently occurring. The FlashCopy® function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume. This copying operation is often referred to as a "copy on write" and is part of a "cleaning" in which dependency of the target volume on the source volume is removed for the grain of data copied.

Therefore, a FlashCopy® is a feature supported on various storage devices that allows a user or an automated process to make nearly instantaneous copies of entire logical volumes of data. A copy of a source disk is made on a target disk. The copies are immediately available for both read and write access. A common feature of FlashCopy® like implementations is the ability to reverse the copy. That is, to populate the source disk of a FlashCopy® map with the contents of the target disk, typically in a restore operation.

There may be two types of point-in-time (PIT) backup processes used in data storage systems. One is called a clone and the other a snapshot. A clone is a PIT copy where the target disk will hold a complete copy of the data that was on the source disk when the PIT copy was started. When the copying of data from source to target completes, the target disk is independent of the source.

Conversely, a snapshot is a PIT copy where the target only holds the changed data necessary to present the PIT copy of the source. Data is typically only copied to the target disk if it is changed on the source. The target disk is generally dependent on some of the data on the source disk in order to present the PIT copy.

It is also possible to use FlashCopy® in cascaded implementations, in which a target disk later becomes the source disk for a further FlashCopy® or vice versa. A cascade may be used to implement multiple PIT copies of a single data source. For example, with a data source S and PIT copies of S taken at times t1, t2 and t3, then at time t1 there is taken a PIT copy using data target T1 resulting in a cascade: S→T1. Then at time t2 there is taken a second PIT copy using data target T2 and resulting in the cascade: S→T2→T1. This arrangement works because if data stored on T1 or S changes between times t1 and t2 the original data can still be found on T1. Alternatively, if the data has not been changed between times t1 and t2, then both T1 and T2 will contain or point to the same data. Adding a third backup at t3 produces the cascade: S→T3→T2→T1.

As described herein, the present invention provides a solution for dynamic volume allocation, resource management, when the dynamic volumes are allocated and/or deleted using one of multiplicity of dynamic volume allocation methods, such as using a high water and maximum (max) settings in IBM® Tivoli® FlashCopy Manager (FCM) device class and/or an allocation request explicitly approved by a computing system. It should be noted that one embodiment of the computing system as used herein is the IBM® Storwize® V7000 and IBM Storwize SVC and also a volume may also be the same thing as a vdisk as described herein. The Vdisk is the IBM SVC/V7000 term for a volume.

The dynamic volume allocation prevents collisions between PITs ingest into a repository and subsequent backup tasks. The repository is a logical component in the SVC/V7000 system that contains deduplicated and compressed PIT backups of production vdisks. A component called copy data services (CDS) ingests PIT backups of production vdisks into the repository as a background task. New vdisk(s), consistency group, and flashcopy mappings are allocated for subsequent backup task as opposed to reusing existing vdisk(s), consistency groups, and FlashCopy mappings that may be currently ingested into a repository.

As described herein, consistency groups address the issue where application data resides across multiple volumes. By placing the FlashCopy relationships into a consistency group, commands can be issued against all of the volumes residing in the group. This enables a consistent point-in-time copy of all of the data even though it may reside on physical separate volume. FlashCopy mappings may be members of a consistency group, or they can be operated in a stand-alone manner, not as part of a consistency group. FlashCopy commands can be issued to a FlashCopy consistency group, which affects all FlashCopy mappings in the consistency group, or to a single FlashCopy mapping if it is not part of a defined FlashCopy consistency group.

It should be noted that there are at least 3 categories/types of collisions: 1) mount, instant restore, file level restore, and/or clone tasks collide with an ingest, 2) a flashcopy backup collides with an ingest, and/or 3) a mount, restore, and/or clone task collides with a flashcopy backup.

Category 1 collisions are collisions resulting from mounting, instantly restoring, file level restoring and/or cloning operations colliding with an ingestion operation. As such the present invention provides the following solutions to category 1 collisions.

First, in one embodiment, the present invention 1) avoids collision between a mount, clone, file level restore, and/or an instant restore of a backup residing on Space Efficient FlashCopy target volumes and an ingest. The embodiment attempts to reuse existing resources (e.g., volumes, fcmaps, consistency groups) after they have been ingested into the repository first and allocate new resources if needed.

Second, in a further embodiment, the present invention avoids collision a mount, clone, file level restore, and/or an instant restore of a backup residing on space efficient flashcopy target volumes and an ingest. The present invention keeps a global pool of allocated resources (e.g., vdisks and consistency groups) available to reuse.

Third, in a further embodiment, the present invention avoids collision a mount, clone, file level restore, and/or an instant restore of a backup residing on space efficient flashcopy target volumes and an ingest. The present invention attempts to reuse old vdisks in an SVC chain after they have been ingested into the repository. If none are available, the present invention uses vdisks from a global pool.

Category 2 collisions are collisions where the flashcopy backup in a target volume collides with an ingest. As such the present invention provides the following solutions to category 2 collisions. First, in one embodiment, the present invention avoids collision where the flashcopy backup in a target volume collides with an ingest by 1) always allocates new vdisks and delete old vdisks after they have been ingested into the repository Second, in a further embodiment, the present invention avoids collision where the flashcopy backup in a target volume collides with an ingest by 2) attempting first to reuse old vdisks in a SVC chain after the old vdisks have been ingested into the repository. If none are available, the present invention allocates new vdisks.

Third, in a further embodiment, the present invention avoids collision where the flashcopy backup in a target volume collides with an ingest by 3) using vdisks from global pool that can be shared by multiple IBM Tivoli FlashCopy Manager initiators (device classes).

Fourth, in a further embodiment, the present invention avoids collision where the flashcopy backup in a target volume collides with an ingest by 3) attempting first to reuse old vdisks in the SVC chain after they have been ingested into the repository. If none are available, the present invention uses vdisks from global pool.

Category 3 collisions are collisions resulting from mounting, restoring, and/or cloning operation colliding with a flashcopy backup. First, in one embodiment, the present invention avoids collisions between mounting, restoring, and/or cloning operation colliding with a flashcopy backup by 1) avoiding collision between reusing for backup and being mounted at the same time. New volumes are always allocated for the backup and old volumes are deleted. It is applicable to environments with and without a repository. New vdisks are always allocated and old vdisks are deleted. If there is a repository, the present invention waits until after they have been ingested into the repository before deleting.

Second, in a further embodiment, the present invention avoids collisions between mounting, restoring, and/or cloning operation colliding with a flashcopy backup by 2) avoiding collision between reusing for backup and being mounted at the same time. It is applicable to environments with and without a repository. The present invention first attempts to reuse old vdisks in a SVC chain after they have been ingested into the repository. If none of the old vdisks available, new vdisks are allocated.

Third, in a further embodiment, the present invention avoids collisions between mounting, restoring, and/or cloning operation colliding with a flashcopy backup by 2) avoiding collision between reusing for backup and being mounted at the same time. It is applicable to environments with and without a repository. The present invention uses vdisks from a global pool that can be shared by multiple IBM Tivoli FlashCopy Manager initiators (device classes).

Fourth, in a further embodiment, the present invention avoids collisions between mounting, restoring, and/or cloning operation colliding with a flashcopy backup by 2) avoiding collision between reusing for backup and being mounted at the same time. It is applicable to environments with and without a repository. The present invention first attempts to reuse old vdisks in an SVC chain after the old vdisks have been ingested into the repository If none of the old vdisks available, vdisks from the global pool are used.

The dynamic volume allocation prevents collisions between PIT ingests into the repository and mount, clone, instant restore, and/or file level restore operations. A mount task mounts a copy of a backup as opposed to the original backup. Mounting a volume causes write modifications to it, which can impact the FlashCopy chain, the repository content, and ingests into the repository.

The dynamic volume allocation prevents collisions between a mount operation, a clone operation, file level restore and/or a instant restore operation and subsequent FlashCopy backup tasks. The dynamic volume allocation avoids the scenario where a FlashCopy backup on a specific set of target vdisks is mounted but the target vdisks need to be reused for a subsequent FlashCopy backup task. The dynamic volume allocation allows multiple read/write independent mounts of the same FlashCopy backup. By spawning independent copies of the original FlashCopy backup PIT during mount processing, each mount operation is read/write accessible independent of one another. The dynamic volume allocation removes the need for the user to manage pre-defined space efficient FlashCopy target volume sets when leveraging the capabilities of IBM Tivoli FlashCopy Manager. The dynamic volume allocation allows a stable map of the latest FlashCopy to be obtained before clone of production volume. The dynamic volume allocation avoids the scenario where a clone of a production can mean not being able to ingest the latest FC backup PIT into the repository prior to initiating the clone operation.

For the dynamic volume allocation, the computing systems resources are managed. In one embodiment, the resources are limited in the SVC (e.g., the SVC/V7000), and the maximum number of FlashCopy mappings per system is 4096, but may be less in some edge cases due to memory consumption. The resources must be shared by multiple types of activities in the same SVC. For the production activities by the customer there is no method to control/limit resource consumption for this type of activity.

The computing system ingests the FlashCopy backups into the repository. The computing system mounts, clones, and/or restores the FlashCopy backups from repository and allocates implicit/explicit vdisks and Fcmaps. For the Backup processing, the computing system allocates vdisks and Fcmaps as backup targets. The computing system also mounts, clones, and/or performs instant restore and file level restore from the SVC managed target volumes and allocates vdisks and Fcmaps. The resources necessary to provide these capabilities may be controlled/limited by the Tivoli FCM instance initiating the tasks or they may be managed natively by the computing system.

The computing system replicates production volumes and FlashCopy Backup related volumes using metro mirrors, global mirrors, and/or low bandwidth global mirror capabilities. These tasks may be initiated from a Tivoli FCM Manager, which integrates with the target system or they may be initiated and managed natively by the computer system. Additionally, the computing system may replicate repository content in a manner that only transfers unique blocks of data to the target system.

In one embodiment, there may be multiple IBM Tivoli FCM instances and the multiple IBM Tivoli FCM instances can share the same SVC system, but do not have visibility of one another.

As mentioned above, the present invention provides for when the dynamic volumes are allocated and/or deleted. For the dynamic allocation scenario, new target volumes for FlashCopy backup tasks are allocated either by the IBM Tivoli FCM instance initiating the backup task or by the native crash consistent SVC function that initiated the backup task. The IBM Tivoli FCM instance or the native crash consistent SVC function needs to allocate volumes for mount, clone, instant restore and/or file level restore of backup PITs on SVC/V7000 managed target volumes. The IBM Tivoli FCM instance or the native crash consistent SVC function allocates dummy volumes during clone of the production volume processing. The IBM Tivoli FCM instance or native crash consistent SVC function makes a call to CDS to create implicit/explicit volumes when using a backup PIT in the repository for one of the following operations: a mount operation, an instant restore operation, a clone operation and/or a file level restore operation. In one embodiment, FCM instance or the native crash consistent SVC function requests a CDS to allocate the volumes.

For the dynamic deletion scenario, the operations need to be synchronized with IBM Tivoli FCM. The FCM core asynchronously invokes a process to delete vdisks and Fcmaps that have the usability state set to "LOCALLY_DELETED" (FCM core sets LOCALLY_DELETED state when ingest monitoring ends). The FCM device agent makes calls to the SVC/V7000 or to the CDS component residing in the SVC/V7000 to remove temporary vdisks and Fcmaps. Dummy volumes are inserted into the chain and deleted by the LOCALLY_DELETED usability state infrastructure of FCM core.

For managing the dynamic volume allocation using the high water and the maximum (max) settings in the IBM Tivoli FlashCopy Manager (FCM) device class and/or an allocation request explicitly approved by a computing system, high-water and max configuration parameters are used and can be set at the FCM device class granularity. The device agent can dynamically allocate up to a high-water during normal operations. Once the high water mark is passed, a warning message is raised (a signal is issued) indicating that the high water has been passed. The dynamic volume allocation computing system enables rolling FlashCopy backups up to high-water during normal operating conditions and allows the FlashCopy backups to go up to the max setting in the case of collision from mount, ingest, clone, restore, operations. For example, consider a high-water that is set equal to 3 with max equal to 5. The dynamic volume allocation computing system allocates resources for up to 3 FlashCopy backups during normal processing. If the high-water mark of 3 is exceeded, a soft warning is issued when 3 is exceeded. In other words, dynamic volume allocation computing system allocates the FlashCopy backups with an "allocate with warning." If resources for the 4$^{th}$ and 5$^{th}$ FlashCopy backup instances are created, the dynamic volume allocation computing system continues to allocate on a GUI but raises a message and/or generates log entry.

In one embodiment, the CDS code is the only entity that has whole view of IBM Storwize SVC/V7000 system resource utilization. The CDS device agent in IBM Tivoli FCM asks the CDS function in the Storwize SVC/V7000 for permission to allocate volumes. In the case of native SVC/V7000 crash consistent data protection, the crash consistent management function residing in the SVC/V7000 asks the CDS function in the SVC/V7000 for permission to allocate volumes. The CDS core code resolves request into the number of vdisks and FlashCopy mappings that must be created. For example, the FlashCopy backup of production application that uses two data stores (vdisks on the SVC) resolves that two vdisks, two Fcmaps, and one consistency group would need to be created. The dynamic volume allocation computing system checks the current resource utilization (e.g., free memory, number of vdisks, Fcmaps, etc.) on the SVC for all crash consistent, application consistent, and production type activities. The dynamic volume allocation computing system approves and/or disapproves the allocation request based on this data. Internally the dynamic volume allocation computing system core code can deploy various mechanisms to determine allocation outcome. The dynamic volume allocation computing system deploys the internal high-water and max settings for each device class and dynamically adjusts the settings based on system load.

FIG. 1 illustrates the concept of a backup process using a storage controller 8 and two storage disks 10 and 12. The disks 10 and 12 could form part of a larger array of disks, and may form part of an enterprise storage solution. The disks 10 and 12 could be part of a storage solution relating to a commercial website, for example. If at any time a backup needs to be made of the content of vdisk1, then a FlashCopy instruction can be sent from the storage volume controller 8 to that disk 10, which defines a source disk 10 (vdisk1) and also a target disk 12 (vdisk2), which is the target of the FlashCopy. The FlashCopy instruction creates a point-in-time copy of the image of the specific vdisk, which is the source disk 10.

In the embodiment of FIG. 1, the source disk 10 of a first FlashCopy instruction is vdisk1, and the target disk 12 is vdisk2. The FlashCopy instruction starts the FlashCopy process, which creates a map 14 from the source disk 10 to the target disk 12. This map is labeled MAP 1 in the Figure. The image of vdisk1 at this specific point in time is now available on vdisk2. This creates a backup of the data on vdisk1, and also allows tests and other administration tasks to be run on the data of vdisk1, without the danger of losing any of the original data, as it is preserved on the original source disk.

When a FlashCopy is made, it creates a link between the two disks 10 and 12, as defined by the map 14. Data may now be copied across in the background, with the additional requirement that any access to vdisk2 (as the target disk 12) may immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point in time copy of vdisk1, although data may only be physically copied across under the circumstances described above.

Figure 2:
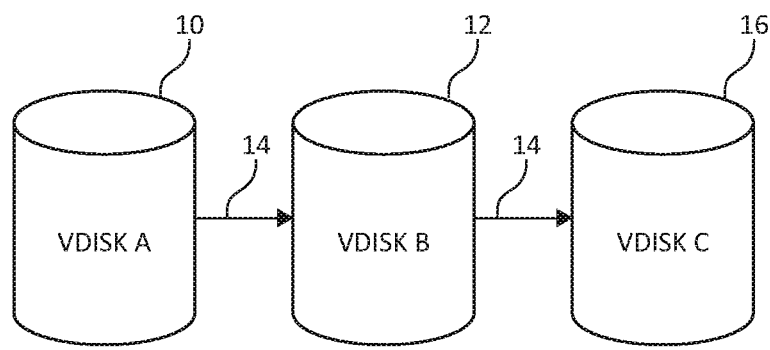
FIG. 2 is a block diagram showing an exemplary hardware structure of a FlashCopy cascade in a computer system according to the present invention in which aspects of the present invention may be realized.

A storage volume that is the target volume of a backup process such as a FlashCopy function can also be the source volume of a further backup process, thus creating a cascade of storage volumes. In FIG. 2 there is shown an example of a FlashCopy cascade of three storage volumes 10, 12 and 16, which are linked by FlashCopy maps 14. Each map 14 defines a backup process from a source volume to a target volume. Disk B is providing a backup of disk A, and disk C is also providing a backup of disk A, through disk B. The FlashCopy functions 14 linking the different storage volumes may have been started at different times, which create different point-in-time copies of the images stored by the respective storage volumes, or could have been started simultaneously.

In the FlashCopy cascade of A→B→C, where A, B and C are the disks in the cascade, as shown in FIG. 2, and the arrows (→) are the FlashCopy maps (the arrows may also represent the FlashCopy backup or FlashCopy maps in other Fig.'s described herein), then denoting (A, B) to be a FlashCopy mapping from disk A to disk B, the cascade has maps (A, B) and (B, C). In this implementation of the cascade, any new data write to disk A will cause a write, that is a "copy write", to disk B, as per the respective FlashCopy function, which is required to maintain the image on disk B. This writing to disk B will cause a further read, often referred to as a "clean read", of disk B followed by another copy write to disk C. In this way a single write to the first storage volume 10 in the cascade can result in a number of JO cleaning operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B is effectively "inserted" between the existing source storage volume A and the existing target storage volume C. This "insertion" is purely a logical construction illustrating the fact that target disk C will receive data writes from disk B, rather than disk A. This is how a cascaded implementation differs from a conventional arrangement, which would have two independent maps from disk A. The storage volume controller may be operated so that the disks and maps are arranged so that clones and snapshots are separated into different dependency chains or cascades.

Figure 3:
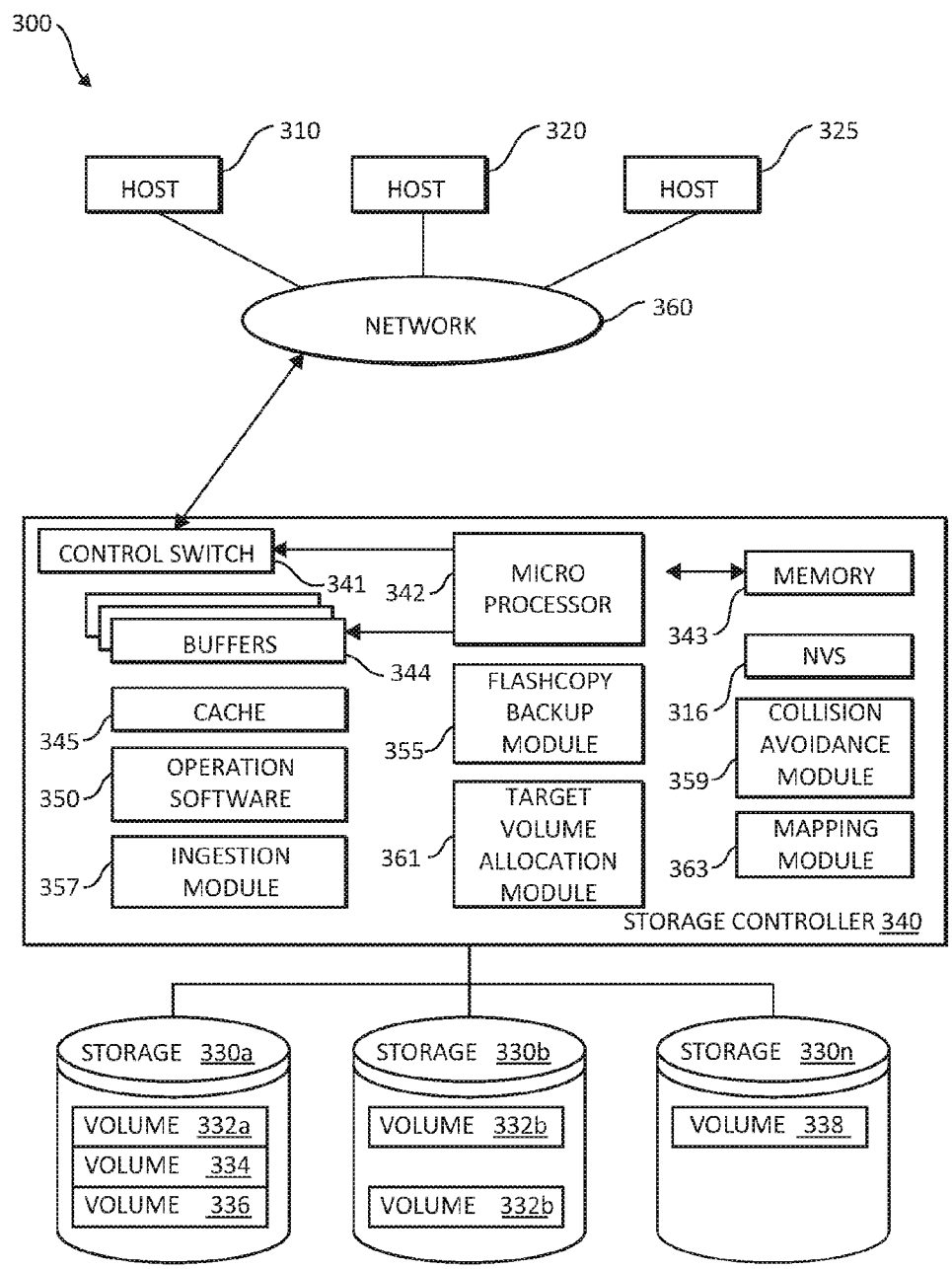
FIG. 3 is a block diagram showing an exemplary hardware structure of a data storage system in a computer system according to the present invention in which aspects of the present invention may be realized.

FIG. 3 is an exemplary block diagram 300 showing a hardware structure of a data storage system in a computer system according to the present invention. Host computers 310, 320, 325, are shown, each acting as a central processing unit for performing data processing as part of a data storage system 300. The hosts (physical or virtual devices), 310, 320, and 325 may be one or more new physical devices or logical devices to accomplish the purposes of the present invention in the data storage system 300. A Network connection 360 may be a fibre channel fabric, a fibre channel point to point link, a fibre channel over ethernet fabric or point to point link, a FICON or ESCON I/O interface, any other I/O interface type, infiniband, SAS, a wireless network, a wired network, a LAN, a WAN, heterogeneous, homogeneous, public (i.e. the Internet), private, or any combination thereof. The hosts, 310, 320, and 325 may be local or distributed among one or more locations and may be equipped with any type of fabric (or fabric channel) (not shown in FIG. 3) or network adapter 360 to the storage controller 340, such as Fibre channel, FICON, ESCON, Ethernet, fiber optic, infiniband, SAS, wireless, coaxial adapters, and/or any other type network adapter. Data storage system 300 is accordingly equipped with a suitable fabric (not shown in FIG. 3) or network adapter 360 to communicate. Data storage system 300 is depicted in FIG. 3 comprising storage controller 340 and storage 330. In one embodiment, the embodiments described herein may be applicable to a variety of types of computing architectures, such as in a virtual cluster management environment using the various embodiments as described herein.

To facilitate a clearer understanding of the methods described herein, storage controller 340 is shown in FIG. 3 as a single processing unit, including a microprocessor 342, system memory 343 and nonvolatile storage ("NVS") 316, which will be described in more detail below. It is noted that in some embodiments, storage controller 340 is comprised of multiple processing units, each with their own processor complex and system memory, and interconnected by a dedicated network within data storage system 300. Storage 330 may be comprised of one or more storage devices, such as storage arrays, which are connected to storage controller 340 by a storage network.

In some embodiments, the devices included in storage 330 may be connected in a loop architecture. Storage controller 340 manages storage 330 and facilitates the processing of write and read requests intended for storage 330. The system memory 343 of storage controller 340 stores the operation software 350, program instructions and data, which the processor 342 may access for executing functions and method steps associated with managing storage 330, and executing the steps and methods of the present invention. As shown in FIG. 3, system memory 343 may also include or be in communication with a cache 345 for storage 330, also referred to herein as a "cache memory", for buffering "write data" and "read data", which respectively refer to write/read requests and their associated data. In one embodiment, cache 345 is allocated in a device external to system memory 343, yet remains accessible by microprocessor 342 and may serve to provide additional security against data loss, in addition to carrying out the operations as described herein.

In some embodiments, cache 345 is implemented with a volatile memory and non-volatile memory and coupled to microprocessor 342 via a local bus (not shown in FIG. 3) for enhanced performance of data storage system 300. The NVS 316 included in data storage controller is accessible by microprocessor 342 and serves to provide additional support for operations and execution of the present invention as described in other figures. The NVS 316, may also be referred to as a "persistent" cache, or "cache memory" and is implemented with nonvolatile memory that may or may not utilize external power to retain data stored therein. The NVS may be stored in and with the cache 345 for any purposes suited to accomplish the objectives of the present invention. In some embodiments, a backup power source (not shown in FIG. 3), such as a battery, supplies NVS 316 with sufficient power to retain the data stored therein in case of power loss to data storage system 300. In certain embodiments, the capacity of NVS 316 is less than or equal to the total capacity of cache 345.

Storage 330 may be physically comprised of one or more storage devices, such as storage arrays. A storage array is a logical grouping of individual storage devices, such as a hard disk. In certain embodiments, storage 330 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 3 may include a logical volume, or simply "volume," may have different kinds of allocations. Storage 330a, 330b and 330n are shown as ranks in data storage system 300, and are referred to herein as rank 330a, 330b and 330n. Ranks may be local to data storage system 300, or may be located at a physically remote location. In other words, a local storage controller may connect with a remote storage controller and manage storage at the remote location. Rank 330a is shown configured with two entire volumes, 334 and 336, as well as one partial volume 332a. Rank 330b is shown with another partial volume 332b. Thus volume 332 is allocated across ranks 330a and 330b. Rank 320n is shown as being fully allocated to volume 338—that is, rank 330n refers to the entire physical storage for volume 338. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 340 may include a FlashCopy backup module 355, an ingestion module 357, a collision avoidance module 359, a target volume allocation module 361, and a mapping module 363. The FlashCopy backup module 355, the ingestion module 357, the collision avoidance module 359, the target volume allocation module 361, and the mapping module 363 may be one complete module functioning simultaneously or separate modules. The FlashCopy backup module 355, the ingestion module 357, the collision avoidance module 359, the target volume allocation module 361, and the mapping module 363 may have some internal memory (not shown) and may store unprocessed, processed, or "semi-processed" data. The FlashCopy backup module 355, the ingestion module 357, the collision avoidance module 359, the target volume allocation module 361, and the mapping module 363 may work in conjunction with each and every component of the storage controller 340, the hosts 310, 320, 325, and other storage controllers 340 and hosts 310, 320, and 325 that may be remotely connected via the storage fabric 360. Both the FlashCopy backup module 355, the ingestion module 357, the collision avoidance module 359, the target volume allocation module 361, and the mapping module 363 may be structurally one complete module or may be associated and/or included with other individual modules. The FlashCopy backup module 355, the ingestion module 357, the collision avoidance module 359, the target volume allocation module 361, and the mapping module 363 may also be located in the cache 345 or other components of the storage controller 340.

The storage controller 340 includes a control switch 341 for controlling the fiber channel protocol to the host computers 310, 320, 325, a microprocessor 342 for controlling all the storage controller 340, a nonvolatile control memory 343 for storing a microprogram (operation software) 350 for controlling the operation of storage controller 340, cache 345 for temporarily storing (buffering) data, and buffers 344 for assisting the cache 345 to read and write data, a control switch 341 for controlling a protocol to control data transfer to or from the FlashCopy backup module 355, the ingestion module 357, the collision avoidance module 359, the target volume allocation module 361, and the mapping module 363 in which information may be set. Multiple buffers 344 may be implemented to assist with the methods and steps as described herein.

In one embodiment, the host computers or one or more physical or virtual devices, 310, 320, 325 and the storage controller 340 are connected through a network adaptor (this could be a fibre channel) 360 as an interface i.e., via a switch called "fabric." The microprocessor 342 may control the memory 343 to store command information from the cluster host/node device (physical or virtual) 310 and information for identifying the cluster host/node device (physical or virtual) 310. The control switch 341, the buffers 344, the cache 345, the operating software 350, the microprocessor 342, memory 343, NVS 316, the FlashCopy backup module 355, the ingestion module 357, the collision avoidance module 359, the target volume allocation module 361, and the mapping module 363 are in communication with each other and may be separate or one individual component(s). Also, several, if not all of the components, such as the operation software 350 may be included with the memory 343. Each of the components within the devices shown may be linked together and may be in communication with each other for purposes suited to the present invention.

In one embodiment, the FlashCopying provides for completion of copying the first primary volume to the second primary volume to be signaled prior to data on the first primary volume being physically copied to the second primary volume. The system may include a first secondary volume to asynchronously mirror the first primary volume, and a second secondary volume to asynchronously mirror the second primary volume. The system includes a secondary storage controller device for the first secondary volume and the second secondary volume, and a secondary host system to communicate directly with the secondary storage controller device. The system includes a primary storage controller device for the first primary volume and the second primary volume and to communicate directly with the secondary host system. The primary storage controller device is unaware of and is unable to directly communicate with the secondary storage controller device.

Responsive to receiving a first command from a primary host system specifying that the first primary volume is to be flash-copied to the second primary volume, the primary storage controller device is to verify at least a first state of the first primary volume and the second primary volume to determine whether at least the first state permits such flash-copying. Responsive to successfully verifying at least the first state, the primary storage controller device is to send a first query to the secondary host system requesting whether the first secondary volume can be flash-copied to the second secondary volume. Responsive to unsuccessfully verifying at least the first state, the primary storage controller device is to send a first response to the primary host system indicating that the first command cannot be fulfilled.

Figure 4:
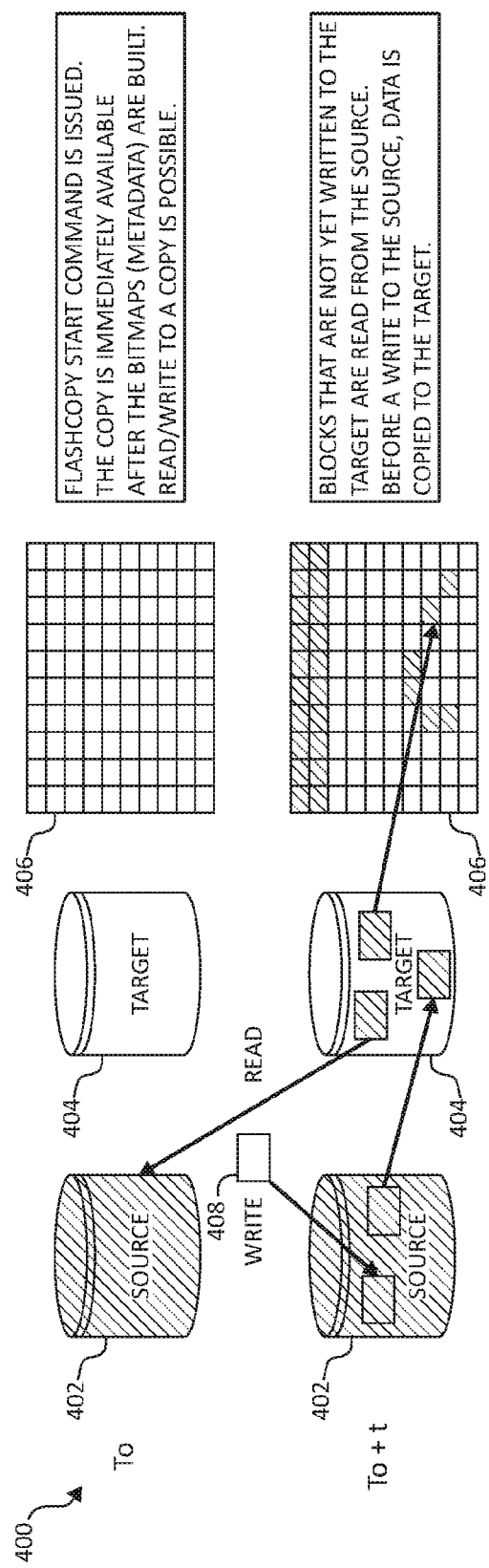
FIG. 4 is a block diagram showing an exemplary hardware structure of a FlashCopy backup operation in a computer system according to the present invention in which aspects of the present invention may be realized.

Yet, in an additional embodiment, there is a production volume P in a storage area network (SAN) volume controller (SVC), such as IBM® Storwize® SVC/V7000. FIG. 4 is a block diagram 400 showing an exemplary hardware structure of a FlashCopy backup operation in a computer system according to the present invention in which aspects of the present invention may be realized. Flashcopy backups of the production volume P (e.g., a source 402) are scheduled periodically. When a Flashcopy backup of P (e.g., the source 402) is initiated at time T0 within the SVC, a space efficient FlashCopy target volume T0 is created. This may be signified by the following notation P→T0. The arrows (→), as used herein, indicates the actual flashcopy map. The Flashcopy space-efficient (SE) feature allocates storage space on an "as-needed" basis by using space on a target volume only when it actually copies tracks (or grains) from the source volume to the target volume. Without space-efficient volumes, the Flashcopy function requires that all the space on a target volume be allocated and available even if no data is copied there. However, with space-efficient volumes, Flashcopy uses only the number of tracks (or grains) that are required to write the data that is changed during the lifetime of the Flashcopy relationship, so the allocation of space is on an "as-needed" basis. Because space-efficient Flashcopy volumes do not require a target volume that is the exact size of the source volume, the Flashcopy SE feature increases the potential for a more effective use of system storage. The space-efficiency attribute may be defined for the target volumes during the volume creation process. A space-efficient volume can be created from any extent pool that has already-created space-efficient storage. As long as the space-efficient source and target volumes have been created and are available, they can be selected when the Flashcopy relationship is created.)

The flashcopy map is a bitmap 406 of changed grains between the production volume P and the space efficient target T0. There are different Flashcopy options in the SVC. For example, as used in FIG. 4, a "no copy option" is used, which means that no background copy of all grains takes place between P (e.g., the source 406) and T0. Only grains that are changed after the snapshot bitmap is created are copied to T0. A flashcopy start command is issued. When a Flashcopy backup of the source 402 is initiated at time T0, a space efficient FlashCopy target volume 404 is created. The copy is immediately available after the bitmaps (metadata) 406 are built. The read/write to a copy is now possible. As depicted in FIG. 4, another backup T0+t is scheduled. Blocks that are not yet written to the target 404 are read from the source 402. Before a write 408 to the source is performed, the data is copied to the target 404.

Figure 5:
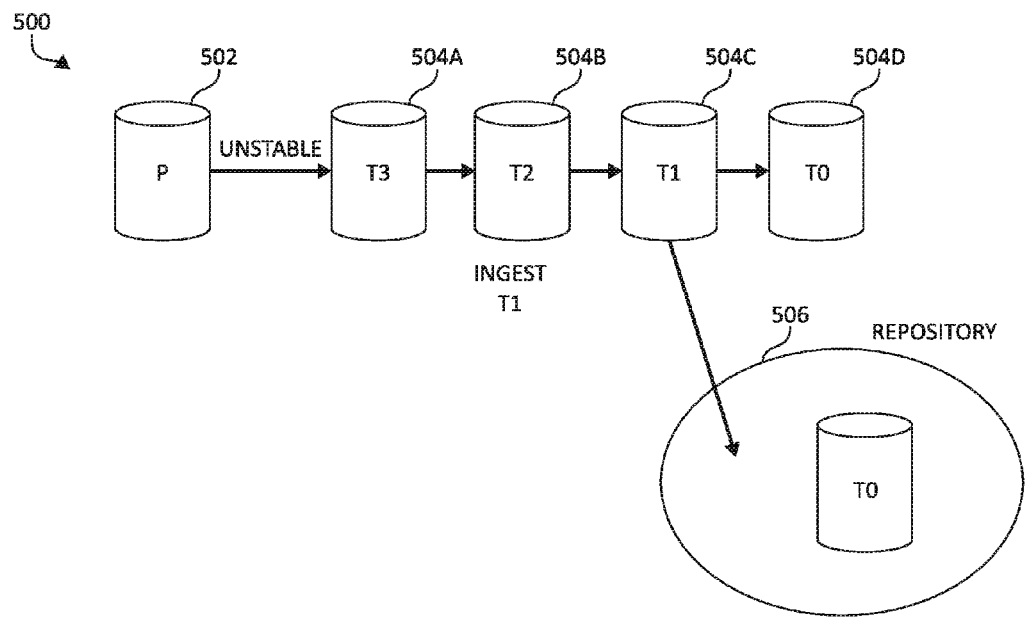
FIG. 5 is a block diagram showing an exemplary hardware structure of a FlashCopy backup operation with target volumes and a repository in a computer system in which aspects of the present invention may be realized.

Now, building off a FIG. 4, as illustrated in FIG. 5, T1 and T0 are not mounted by the host and are not changing. Therefore the flashcopy map between T1 and T0 is frozen in time. The flashcopy map between P and T1 is not frozen in time because the production volume P can be changing due to writes from the host, which will follow the behavior FIG. 4. FIG. 5 is a block diagram 500 showing an exemplary hardware structure of a FlashCopy backup operation with target volumes and a repository in a computer system. Either the Tivoli Flashcopy manager or a native svc crash consistent data protection function schedules the backup schedules Flashcopy backups of the production volume P 502. When a Flashcopy backup of P is initiated at time T0 within the SVC, a space efficient FlashCopy target volume T0 (the target volumes are illustrated as T0, depicted as 504D, T1, depicted as 504C, T2, depicted as 504B, and T3, depicted as 504A) is created. This is signified, for example, by the following notation P→T0. The repository 506 is a logical entity within the SVC that ingests the content residing on the flashcopy target volumes 504. It does so by ingesting stable flashcopy maps and the associated changed grains as a background task. The repository is a logical component in the SVC/V7000 system that contains deduplicated and compressed PIT backups of production vdisks. A component called copy data services (CDS) ingests PIT backups of production vdisks into the repository as a background task. In FIG. 5, once T1 504C exists there is a stable map between T1 and T0; therefore T0 504D may be ingested into the repository 506. The backups may continue. IBM Tivoli FlashCopy manager schedules application consistent snapshot backups. In one embodiment, the present invention/computing system is built upon existing copy services function available in storage controllers (e.g., IBM storage controllers) to enable a revolutionary approach to address the expanding data protection and retention needs of customers as efficiently and economically as possible utilizing snapshot based backups while also enabling new customer use cases. The computing system integrates with a Flash Copy Manager (FCM) (e.g., Tivoli® FCM) in order to provide application consistent snapshot support and also provides crash consistent snapshot support natively without the use of FCM.

The computing system architecture enables it to be integrated with different storage controllers and host applications to provide an in-band solution which allows the computing system enabled storage controller to manage production data and have that same storage controller manage snapshot backups of the production data contained in a repository. The production data and repository are managed by the computing system enabled controller as internal and/or external storage. The computing system code running in the storage controller creates an initial data reduced full copy of the production volumes in a repository using data reduction techniques such as data deduplication and IBM Storwize Real Time Compression™ (RTC). The deltas between subsequent snapshots are deduplicated and then compressed using RTC in the repository to further minimize capacity consumption and significantly extend the amount of FlashCopy restore points that are retained in the repository. The repository and FCM metadata may be replicated to a remote location for disaster recovery. Existing SVC replication techniques may be leveraged to provide replication and disaster recovery capabilities. Network bandwidth for this replication will be dramatically reduced because the repository only contains deduplicated data. Also, the present invention computing system based replication method that uses deduplication, RTC and other data reduction techniques may be used to further reduce the required network bandwidth. A copy of the production volume at any point in time can be recreated nearly instantly from the repository. Customers may mount a snapshot backup and use a TSM client to offload the data to TSM server attached storage for longer-term retention.

Figure 6:
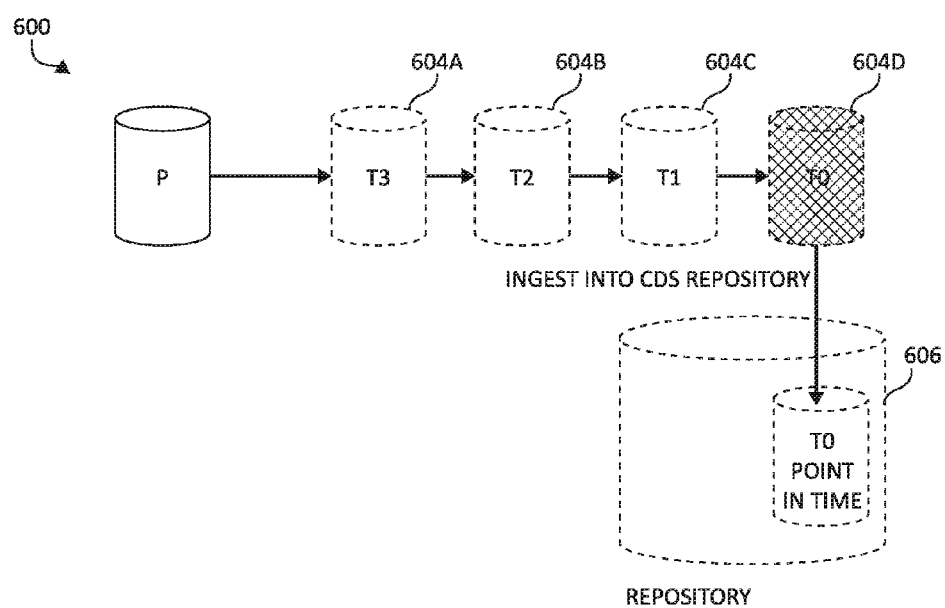
FIG. 6 is a block diagram showing an exemplary hardware structure of a FlashCopy backup operation without dynamic volume allocation in a computer system in which aspects of the present invention may be realized.
Figure 11:
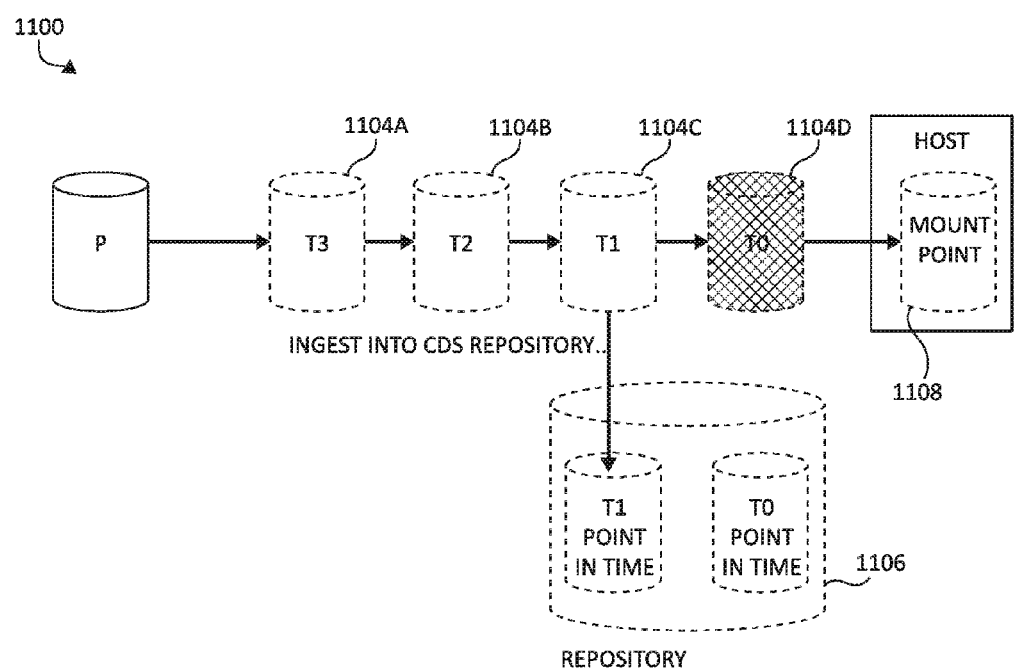
FIG. 11 is a block diagram showing an exemplary hardware structure for dynamically allocating a new space efficient flashcopy target volume if an existing space efficient flashcopy target volume is being mounted by a host in a computer system in which aspects of the present invention may be realized.

However, a current challenge of Flashcopy backups pertains to ingesting Flashcopy/snapshot backups in an SVC into a repository while also generating new FlashCopy backups, as depicted in FIG. 6. Another challenge arises when the existing space efficient flashcopy target volume that needs to be reused is mounted by the host. It is not possible to reuse the existing space efficient flashcopy target volume for a new FlashCopy (FC) backup since it would overwrite the content that is being presented to the host. Thus, if an existing space efficient flashcopy target volume (e.g., T0) is being mounted, new space efficient flashcopy target volumes need to be dynamically allocated as indicated in FIG. 11.

FIG. 6 is a block diagram 600 showing an exemplary hardware structure of a FlashCopy backup operation without dynamic volume allocation in a computer system. As illustrated, a precondition has 3 Flashcopy SE target vdisks predefined as a space efficient FlashCopy target volumes T0, T1, T2, and T3 (the target volumes are illustrated as T0, depicted as 604D, T1, depicted as 604C, T2, depicted as 604B, and a next FC backup/T3, depicted as 604A). The challenge is the target vdisk T0 needs to be reused but T0 604D has not been fully ingested into the repository 606. The repository 606 is a logical entity within the SVC that ingests the content residing on the flashcopy target volumes 604. IBM Tivoli FCM, native crash consistent data protection function, or any other suitable backup scheduler schedules Flashcopy backups of the production volume P. The following notation, by way of example only, P→T0 signifies this. Also, there are FlashCopy backups between next FC backup→T2, T2→T1, and T1→T0. It does so by ingesting stable flashcopy maps and the associated changed grains as a background task. There is a resource conflict between the next FlashCopy (FC) backup (e.g., T3 604A) and the repository 606 because T0 is needed to be reused for the for the next FlashCopy (FC) backup but T0 604D is being ingested by the repository 606.

Figure 7:
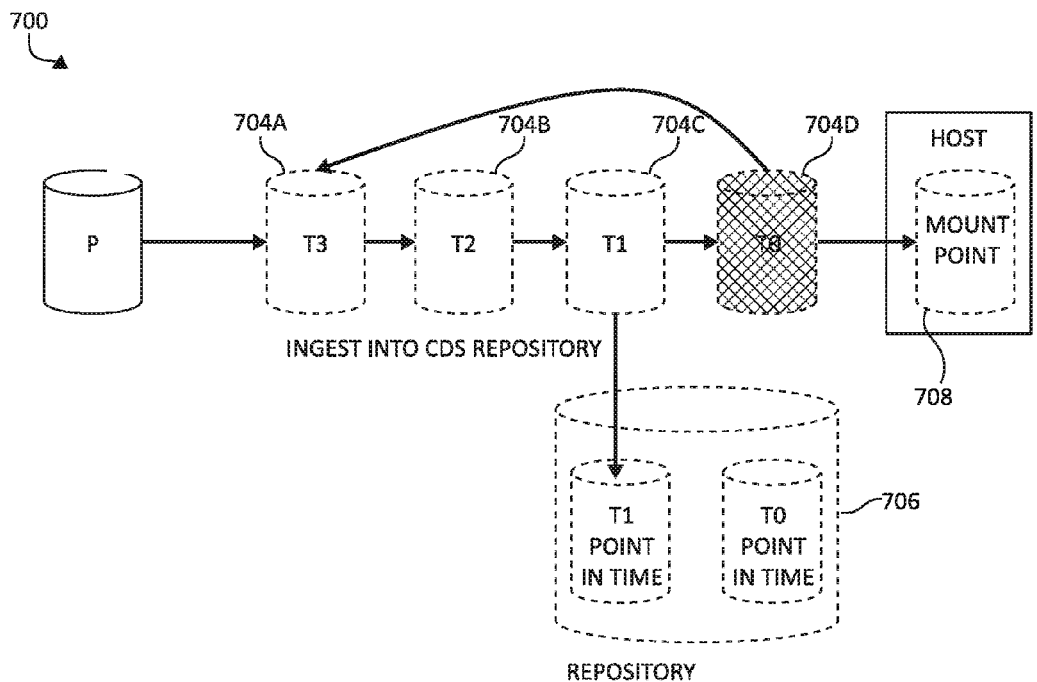
FIG. 7 is a block diagram showing an exemplary hardware structure reusing collision with a mount in a system with a first and second repository without dynamic volume allocation in a computer system in which aspects of the present invention may be realized.

Another challenge arises when the target vdisk that needs to be reused is being used as the source of a mount, clone, instant restore, or file level restore operation. It is not possible to reuse the target vdisk for a new backup since it would overwrite the content that is being presented to the host. FIG. 7 illustrates this use case. FIG. 7 is a block diagram 700 showing an exemplary hardware structure reusing collision with a mount in a system with a first and second repository without dynamic volume allocation in a computer system. The FCM device agent asks for permission to reuse T0. As illustrated, a precondition has 3 Flashcopy SE target vdisks predefined as a space efficient FlashCopy target volumes T0, T1, T2, and T3 (the target volumes are illustrated as T0, depicted as 704D, T1, depicted as 704C, T2, depicted as 704B, and a next FC backup/T3, depicted as 704A). The challenge is the target vdisk T0 needs to be reused but T0 704D is being mounted to a host 708 (e.g., T0 needs to be reused for the next FC backup 704A but T0 704D is being used for a mount task). The repository 706 is a logical entity within the SVC that ingests the content residing on the flashcopy target volumes 704. schedules Flashcopy backups of the production volume P. The following notation, by way of example only, P→T0 signifies this. Also, there are FlashCopy backups between next FC IBM Tivoli FCM, native crash consistent data protection function, or any other suitable backup scheduler backup→T2, T2→T1, and T1→T0. There is a resource conflict between the next FlashCopy (FC) backup (e.g., T3 704A) because T0 is needed to be reused for the next FlashCopy (FC) backup but T0 704D is being used for a mount task for the host 708. In short, as described in FIG. 7, FIG. 7 is addressing collision avoidance with a mount and an ingest collision.

In one embodiment, the present invention provides a solution that attempts to reuse existing FlashCopy target volumes that contain previous FlashCopy/snapshot backups that have already been ingested into the repository and that are not being used as the source for a mount, clone, instant restore and/or file level restore task. By attempting to reuse existing resources (vdisks, FlashCopy maps, and consistency groups) processing overhead may be minimized when compared to always allocating new volumes for this use case. In addition there is no need to track resources in a global manner. Instead IBM Tivoli FCM can attempt to reuse resources that already exist in the dedicated device class.

Figure 8:
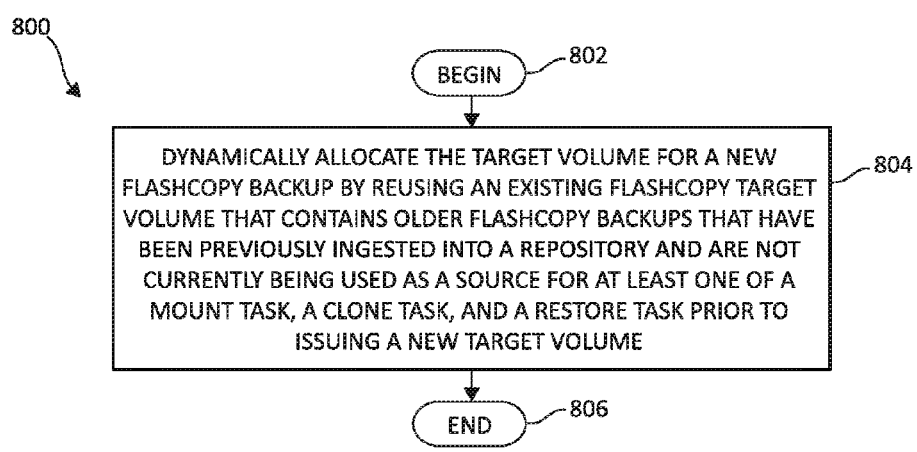
FIG. 8 is a flowchart illustrating an exemplary method for efficient FlashCopy backup target volume allocation with reuse while ingesting FlashCopy backups into a repository in which aspects of the present invention may be realized.

FIG. 8 is a flowchart illustrating an exemplary method 800 for efficient FlashCopy backup target volume allocation with reuse while ingesting FlashCopy backups into a repository in which aspects of the present invention may be realized. The method 800 begins (step 802) by dynamically allocating a target volume for a new FlashCopy backup by reusing an existing FlashCopy target volume containing older FlashCopy backups that have been previously ingested into a repository and are not currently being used as a source for at least one of a mount task, a clone task, and a restore task prior to issuing a new target volume (step 804). The method 800 ends (step 806).

Figure 9:
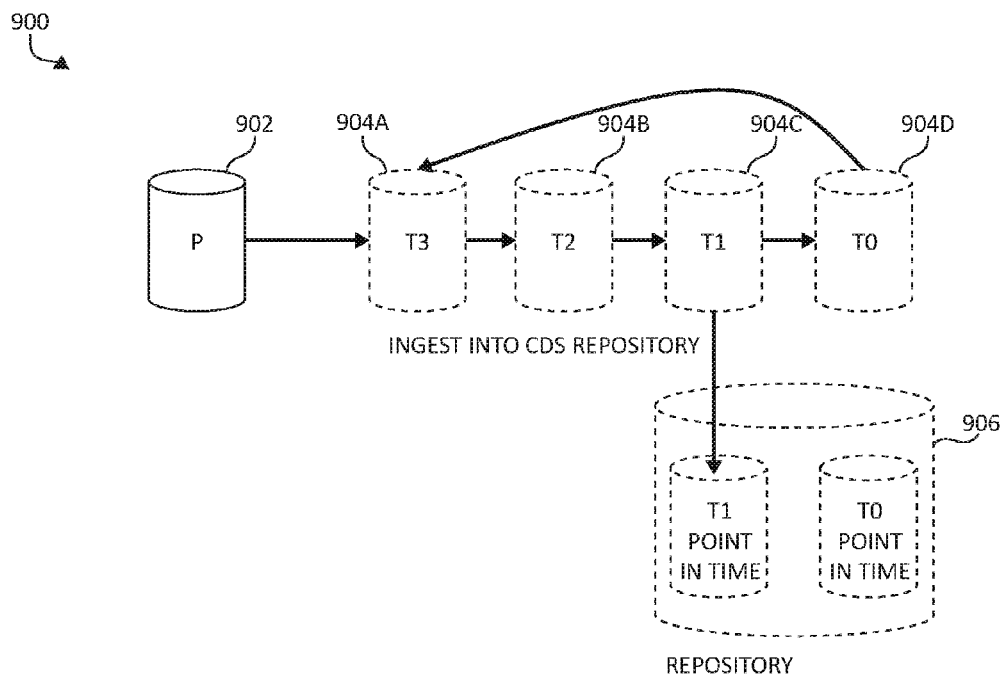
FIG. 9 is a block diagram showing an exemplary hardware structure for reusing an existing space efficient flashcopy target volume before allocating a new space efficient flashcopy target volume for dynamic volume allocation for in a computer system in which aspects of the present invention may be realized.

As part of the Flashcopy backup processing, the FCM attempts to reuse existing target vdisks before allocating new target vdisks, as illustrated in FIG. 9. On the other hand, if T0 is being ingested into the repository, a new target vdisk T3 is allocated for the new backup task as indicated in FIG. 10.

FIG. 9 is a block diagram showing an exemplary hardware structure 900 for reusing an existing space efficient flashcopy target volume before allocating a new space efficient flashcopy target volume for dynamic volume allocation for in a computer system. As illustrated, a precondition has 3 Flashcopy SE target vdisks predefined as a space efficient FlashCopy target volumes T0, T1, and T2 (the target volumes are illustrated as T0, depicted as 904D, T1, depicted as 904C, T2, depicted as 904B, and T3/a next FC backup, depicted as 904A). For dynamic volume allocation of the target volumes, target vdisk T0 904D is reused because T0 904D has previously been ingested into the repository 906. The repository 906 is a logical entity within the SVC that ingests the content residing on the flashcopy target volumes 904. The production volume P 902 schedules Flashcopy backups of the production volume P. The following notation, for example, P→T0, signifies this. Also, there are FlashCopy backups between next FC backup→T2, T2→T1, and T1→T0. Simultaneously, while T0 is being reused for the for the next FlashCopy (FC) backup, the flashcopy target volume T1 904C is being ingested into the repository. Collisions are avoided while T0 is being reused for the next FlashCopy (FC) backup 904A and while the flashcopy target volume T1 904C is being fully ingested into the repository.

Figure 10:
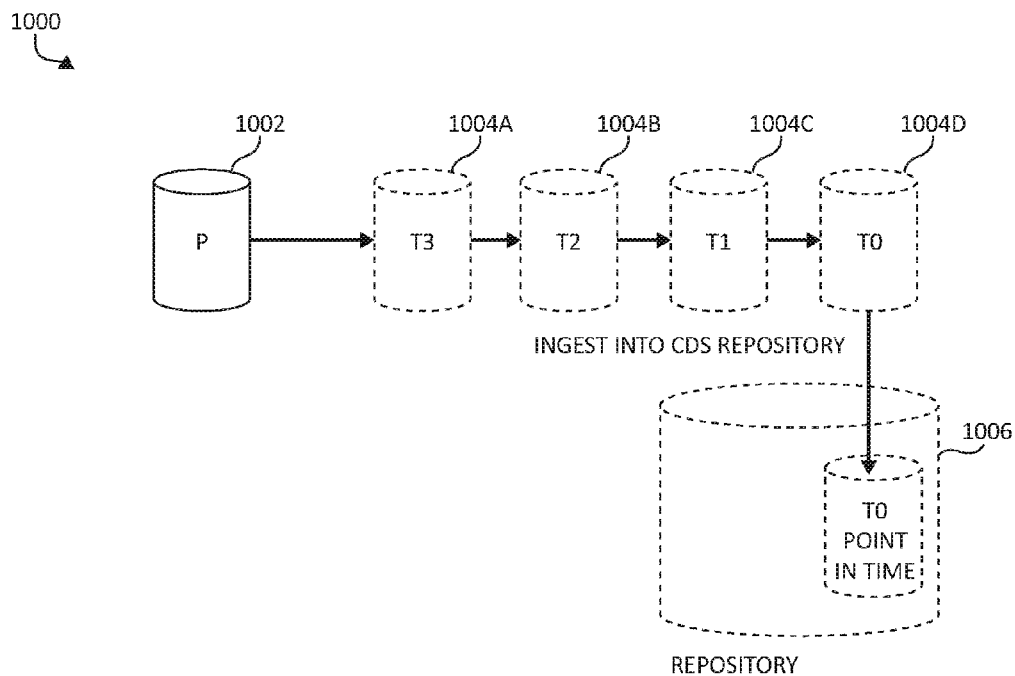
FIG. 10 is a block diagram showing an exemplary hardware structure for dynamically allocating a new space efficient flashcopy target volume if an existing space efficient flashcopy target volume is being ingested in a repository for in a computer system in which aspects of the present invention may be realized.

If T0 is being ingested into the repository when a new FlashCopy backup is required, a new target vdisk T3 is allocated for the new backup task as indicated in FIG. 10. This is because there is a resource conflict between the next FlashCopy (FC) backup and the existing FlashCopy backup target volume (e.g., T0) that is being ingested into the repository. FIG. 10 is a block diagram showing an exemplary hardware structure 1000 for dynamically allocating a new space efficient flashcopy target volume if an existing space efficient flashcopy target volume is being ingested in a repository. As illustrated, a precondition, by way of example only, has 3 Flashcopy SE target vdisks predefined as a space efficient FlashCopy target volumes T0, T1, T2, and T3 (the target volumes are illustrated as T0, depicted as 1004D, T1, depicted as 1004C, T2, depicted as 1004B, and a next FC backup (T3), depicted as 1004A). In FIG. 10, the flashcopy target volume T0 is being ingested into the repository so a new target vdisk T3 1004A is allocated for the new flashcopy backup task. The new space efficient flashcopy target volume T3 1004A is dynamically created in the same pool as the existing space efficient flashcopy target volumes 1004. The dynamic volume allocation computing system 1000 allows a customer to meet RPO. The dynamic volume allocation computing system 1000 is allowed to continue to ingest exiting backup PIT residing on the Flashcopy SE target vdisks 1004.

Either the Tivoli Flashcopy manager or a native svc crash consistent data protection function schedules the backup schedules Flashcopy backups of the production volume P 1002. For dynamic volume allocation of the target volumes, since target vdisk T0 100DA is being ingested into the repository 1006. This is signified by the following notation P→T0. Also, there are FlashCopy backups between next FC backup→T2, T2→T1, and T1→T0. Since T0 is being ingested into the repository, a new space efficient flashcopy target volume T3 1004A is dynamically created in the same pool as the existing space efficient flashcopy target volumes 1004 for the for the next FlashCopy (FC) backup. In short, a new space efficient flashcopy target volume is allocated to avoid a collision with an existing space efficient flashcopy target volume that is being ingested into the repository.

FIG. 11 is a block diagram showing an exemplary hardware structure 1100 for dynamically allocating a new space efficient flashcopy target volume if an existing space efficient flashcopy target volume is being mounted by a host in a computer system. The FCM device agent asks for permission to reuse T0. As illustrated, by way of example only, a precondition has 3 Flashcopy SE target vdisks predefined as a space efficient FlashCopy target volumes T0, T1, T2, T3 (the target volumes are illustrated as T0, depicted as 1104D, T1, depicted as 1104C, T2, depicted as 1104B, and T3/a next FC backup, depicted as 1104A). The challenge is the target vdisk T0 needs to be reused but T0 1104D is being mounted to a host 1108 (e.g., T0 needs to be reused for the next FC backup 1104A but T0 1104D is being used for a mount task). The repository 1106 is a logical entity within the SVC that ingests the content residing on the flashcopy target volumes 1104. IBM Tivoli FCM, native crash consistent data protection function, or any other suitable backup scheduler schedules Flashcopy backups of the production volume P. The following notation, for example, P→T0 signifies this. Also, there are FlashCopy backups between next T3→T2, T2→T1, and T1→T0. It does so by ingesting stable flashcopy maps and the associated changed grains as a background task. There is a resource conflict between the next FlashCopy (FC) backup (e.g., T3 1104A) because T0 is needed to be reused for the next FlashCopy (FC) backup T3 1104A but T0 1104D is being mounted by the host 1108.

To avoid the next/new FlashCopy backup from being rejected until the mounting of T0 is completed, and for avoiding a customer to miss a recovery point objective (RPO)/backup window, a new space efficient flashcopy target volume T3 1104A is dynamically created in the same pool as the existing space efficient flashcopy target volumes 1104 for the for the next FlashCopy (FC) backup. In short, a new space efficient flashcopy target volume is allocated to avoid a collision with an existing space efficient flashcopy target volume that is being mounted to a host 1108. It should be noted that T1 1104C is a also an existing space efficient flashcopy target volume 1104 that is being ingested into a repository, as depicted in FIG. 11 for illustration purposes only, and therefore presents resource conflict between the next FlashCopy (FC) backup (e.g., T3 1104A) and the repository 1108 because T1 is being ingested by the repository 1106, which also requires a new space efficient flashcopy target volume T3 1104A to be dynamically created in the same pool as the existing space efficient flashcopy target volumes 1104, if it was desired to use T1 rather than T0.

Figure 12A:
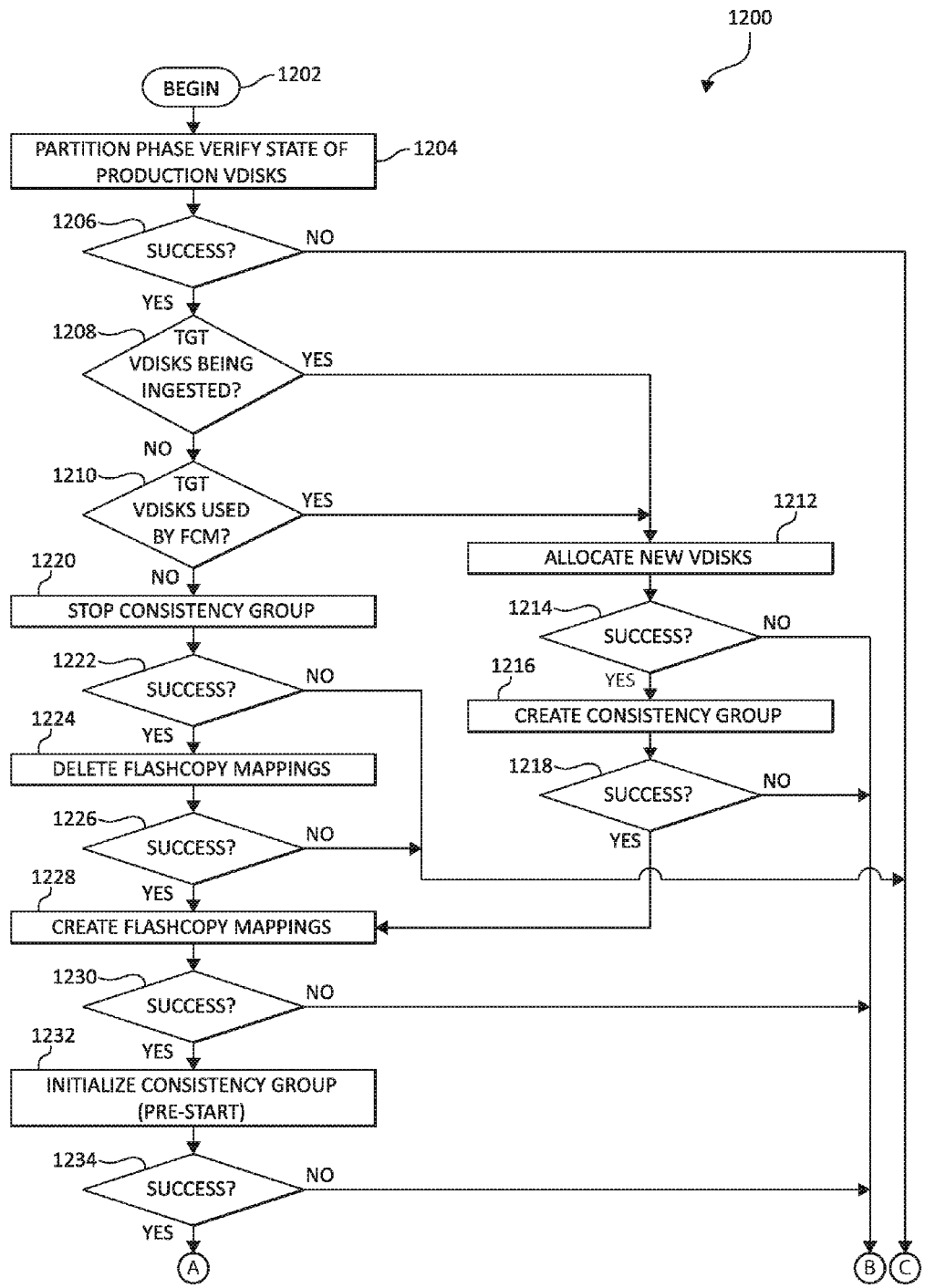
FIG. 12A-B is a flowchart illustrating an additional exemplary method for dynamically allocating a FlashCopy backup target volume allocation for reuse while ingesting FlashCopy backups into a repository in which aspects of the present invention may be realized.
Figure 12B:
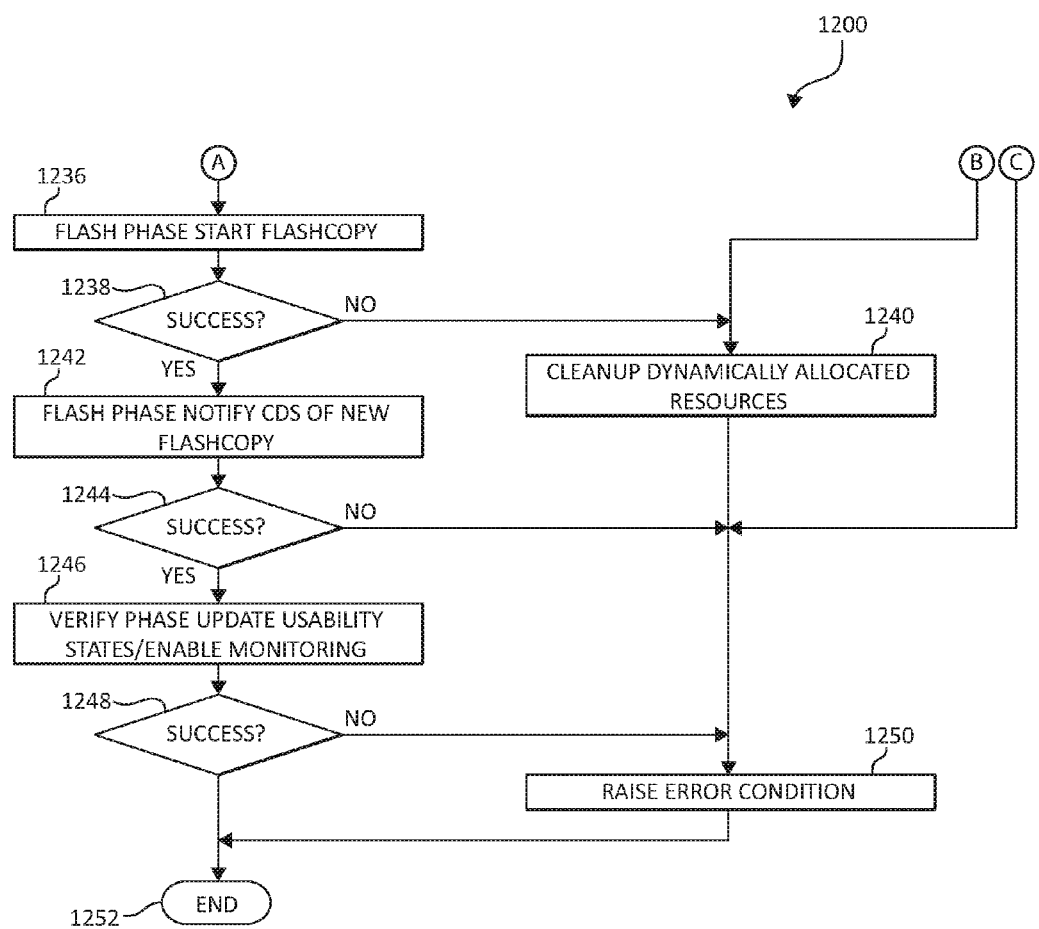

FIG. 12A-B is a flowchart illustrating an additional exemplary method 1200 for dynamically allocating a FlashCopy backup target volume allocation for reuse while ingesting FlashCopy backups into a repository in which aspects of the present invention may be realized. The method 1200 begins (start 1202) by verifying a state of production target volumes (in a partition phase) (step 1204). The method 1200 determines if the verification process was a success (step 1206). If no, the method 1200 raises an error condition (step 1250) and then the method 1200 ends (step 1252). If the state of production target volumes is verified, the method 1200 determines if existing space efficient flashcopy target volumes are being ingested (step 1208). If yes, then in a prepare phase, the method 1200 dynamically allocates a new space efficient flashcopy target volume(s) (step 1212). In the prepare phase following step 1212, the method 1200 determines if the new space efficient flashcopy target volume was successfully allocated (step 1214). If no, the method 1200 dynamically cleans up any dynamically allocated resources (step 1240). If yes (from step 1214), the method 1200 creates a consistency group (step 1216). The method 1200 determines if the consistency group was successfully created (step 1218). If no, the method 1200 dynamically cleans up any dynamically allocated resources (step 1240). If yes (from step 1218), the method 1200 creates FlashCopy backup mappings (step 1228).

Returning to step 1208, if existing space efficient flashcopy target volumes are not being ingested (step 1208), the method 1200 determines if the existing space efficient flashcopy target volume(s) are being used by a FlashCopy manager (FCM) (step 1210). The FCM may perform a mount operation, a clone operation, an instant restore operation, and/or a file level restore operation on the existing space efficient flashcopy target volume(s) that needs to be reused. If yes, the method 1200 goes to step 1212. If no, the method 1200 terminates/stops a consistency group (step 1220). The method 1200 determines if the consistency group was successfully terminated/stopped (step 1222). If no, the method 1200 raises an error condition (step 1250) and ends (step 1252). If yes, the method 1200 deletes FlashCopy backup mappings (step 1224). The method 1200 determines if the FlashCopy backup mappings were deleted (step 1226). If no, the method 1200 raises an error condition (step 1250) and ends (step 1252). If yes, the method 1200 creates FlashCopy backup mappings (step 1228). The method 1200 determines if the FlashCopy backup mappings were successfully created (step 1230). If no, the method 1200 dynamically cleans up any dynamically allocated resources (step 1240), raises an error condition (step 1250) and ends (step 1252). If yes (from step 1230), the method 1200 initializes a consistency group (e.g., a pre-start) (step 1232). The method 1200 determines if the consistency group was successfully initialized (step 1234). If no, the method 1200 dynamically cleans up any dynamically allocated resources (step 1240), raises an error condition (step 1250) and ends (step 1252). If yes (from step 1234), the method 1200 starts a FlashCopy backup (in a Flash phase) (step 1236). The method 1200 determines if the FlashCopy backup was successfully started (step 1238). If no, the method 1200 dynamically cleans up any dynamically allocated resources (step 1240), raises an error (step 1250) and ends (step 1252).

If yes (from step 1238), the method 1200, in the flash phase, notifies a copy data services (CDS) of the new space efficient flashcopy backup (step 1242). The method 1200 determines if the CDS was successfully notified of the new space efficient flashcopy backup (step 1244). If no, the method 1200 raises an error condition (step 1250) and then the method 1200 ends (step 1252). If yes (from step 1244), the method 1200, in a verify/verification phase, updates the usability of states of the space efficient flashcopy backups and/or enables monitoring of the states and/or existing space efficient flashcopy backup target volumes (step 1246). The method 1200 determines if the usability of states of the existing space efficient flashcopy backups was successfully updated and/or the monitoring of the states and/or existing space efficient flashcopy backup target volumes was successfully enabled (step 1248). If no, the method 1200 raises an error condition (step 1250). The method 1200 ends (step 1252).

In one embodiment, the present invention keeps and/or maintains a global pool of FlashCopy target volumes and consistency groups that are used for new FlashCopy backup tasks upon encountering a collision while ingesting an existing FlashCopy Backup into a repository. By attempting to reuse existing resources (e.g., virtual disks "vdisks", and consistency groups) processing overhead may be minimized when compared to always allocating new volumes for this use case or when compared to reusing existing target volumes that are only within the scope of the same FlashCopy chain. In other words, the global pool may be used by multiple IBM Tivoli FCM device classes using the same storage controller.

Figure 13:
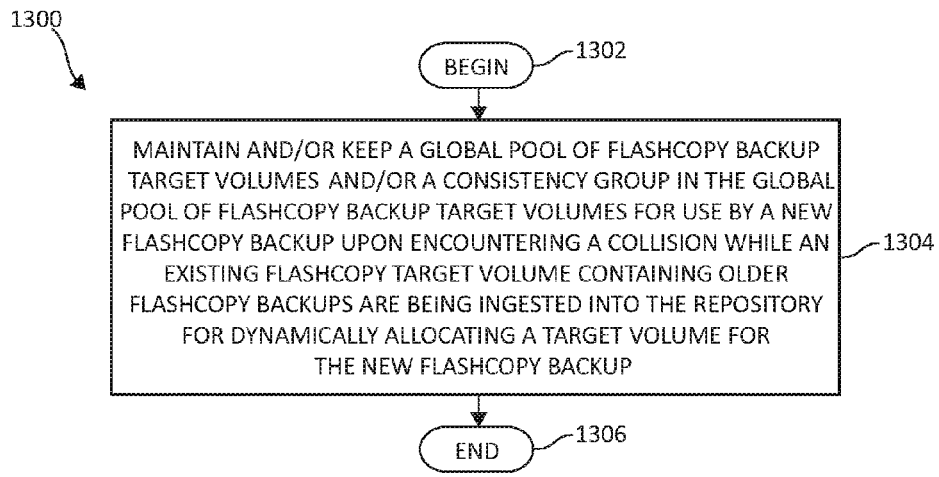
FIG. 13 is a flowchart illustrating an exemplary method for efficient FlashCopy backup target volume allocation from a shared resource pool while ingesting a FlashCopy backup in a repository using a processor device in a computing environment in which aspects of the present invention may be realized.

FIG. 13 is a flowchart illustrating an exemplary method 1300 for efficient FlashCopy backup target volume allocation from a shared resource pool while ingesting a FlashCopy backup in a repository using a processor device in a computing environment. The method 1300 begins (step 1302) by maintaining and/or keeping a global pool of FlashCopy backup target volumes and/or a consistency group in the global pool of FlashCopy backup target volumes for use by a new FlashCopy backup upon encountering a collision while an existing FlashCopy target volume containing older FlashCopy backups are being ingested into the repository for dynamically allocating a target volume for the new FlashCopy backup (step 1304). The method 1300 ends (step 1306).

Figure 14:
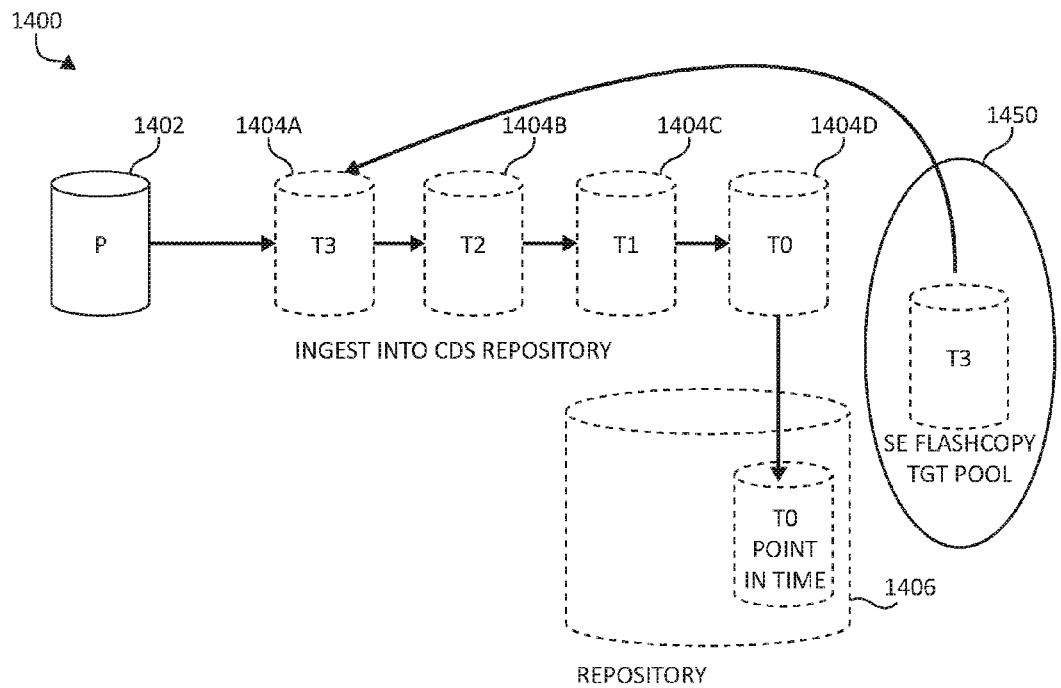
FIG. 14 is a block diagram showing an exemplary hardware structure for efficient FlashCopy backup target volume allocation from a shared resource pool while ingesting a FlashCopy backup in a repository in a computer system in which aspects of the present invention may be realized.

FIG. 14 is a block diagram showing an exemplary hardware structure 1400 for efficient FlashCopy backup target volume allocation from a shared resource pool while ingesting a FlashCopy backup in a repository in a computer system. As illustrated, by way of example only, there are 4 space efficient FlashCopy target volumes T0, T1, T2, and T3 (the target volumes are illustrated as T0, depicted as 1404D, T1, depicted as 1404C, T2, depicted as 1404B, and T3, depicted as 1404A). In a partition phase, a determination is made as to whether a production volume P 1402 exists. Flashcopy backups of the production volume P are illustrated, for example, by the notation P→T0. Also, there are FlashCopy backups between next T3→T2, T2→T1, and T1→T0. In a prepare phase, one of the space efficient FlashCopy target volumes T0, T1, T2, and T3 (1404D-A) are retrieved along with a consistency group from the global shared resource pool 1450. If there are no space efficient FlashCopy target volumes or a consistency group, these may be created. A FlashCopy map is created. A consistency group is also prepared. In a flash phase, the consistency group is started. In a verify phase, the usability state are updated. FIG. 14 illustrates keeping and/or maintaining a global pool of FlashCopy target volumes 1404 and consistency groups that are used for new FlashCopy backup tasks upon encountering a collision while ingesting an existing FlashCopy Backup, into a repository. In FIG. 14, T0 1404A is ingested into the repository 1406. In one embodiment, a repository 1406 is a logical entity within the SVC that ingests the content residing on the flashcopy target volumes 1404. It does so by ingesting stable flashcopy maps and the associated changed grains as a background task. There is a resource conflict between the next FlashCopy (FC) backup (e.g., T3 1404A) and the repository 1406 because T0 is needed to be reused for the next FlashCopy (FC) backup T3 1404A but T0 1404D is being ingested by the repository 1406.

Figure 15A:
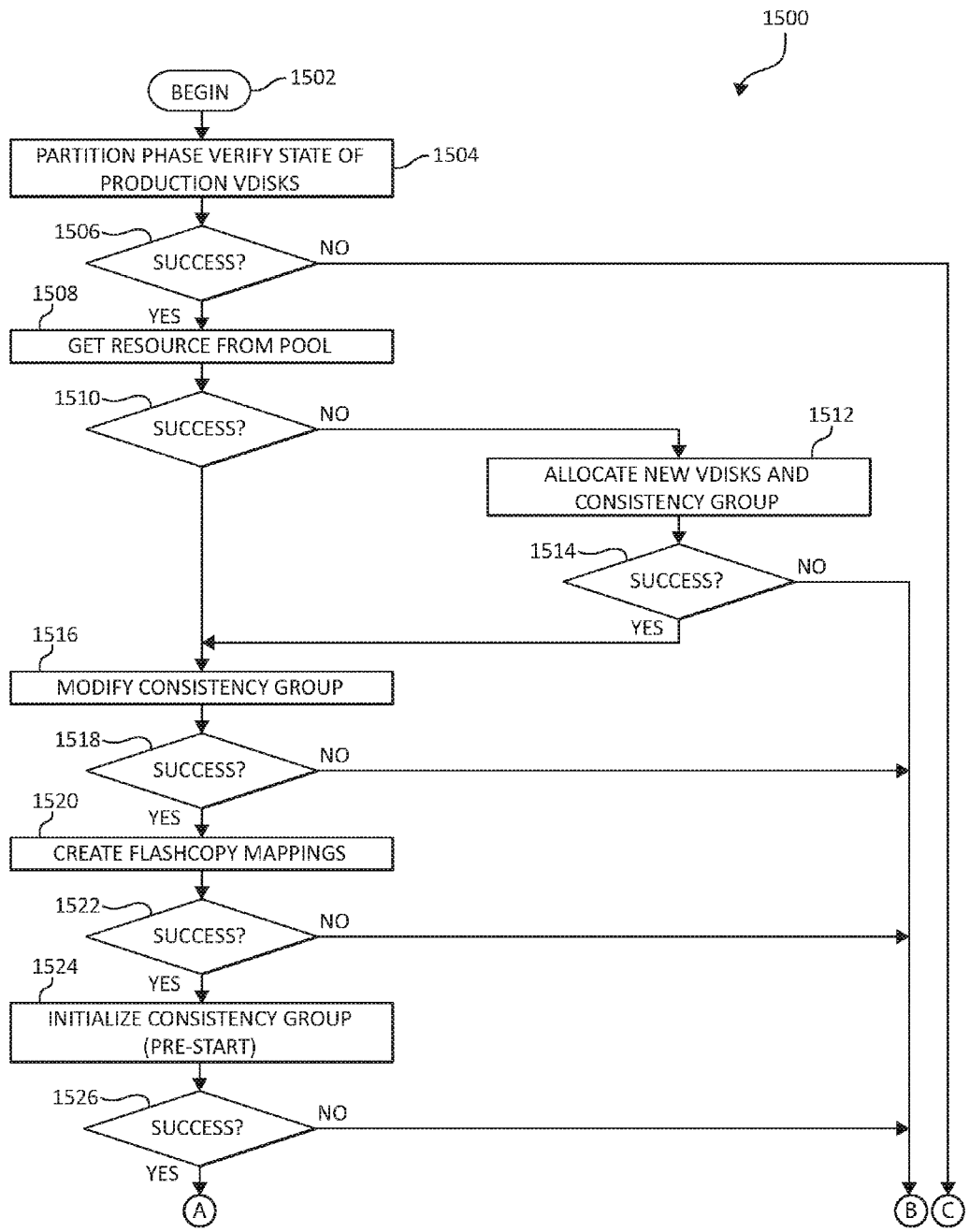
FIG. 15A-B is a flowchart illustrating an additional exemplary method for efficient FlashCopy backup target volume allocation from a shared resource pool in which aspects of the present invention may be realized.
Figure 15B:
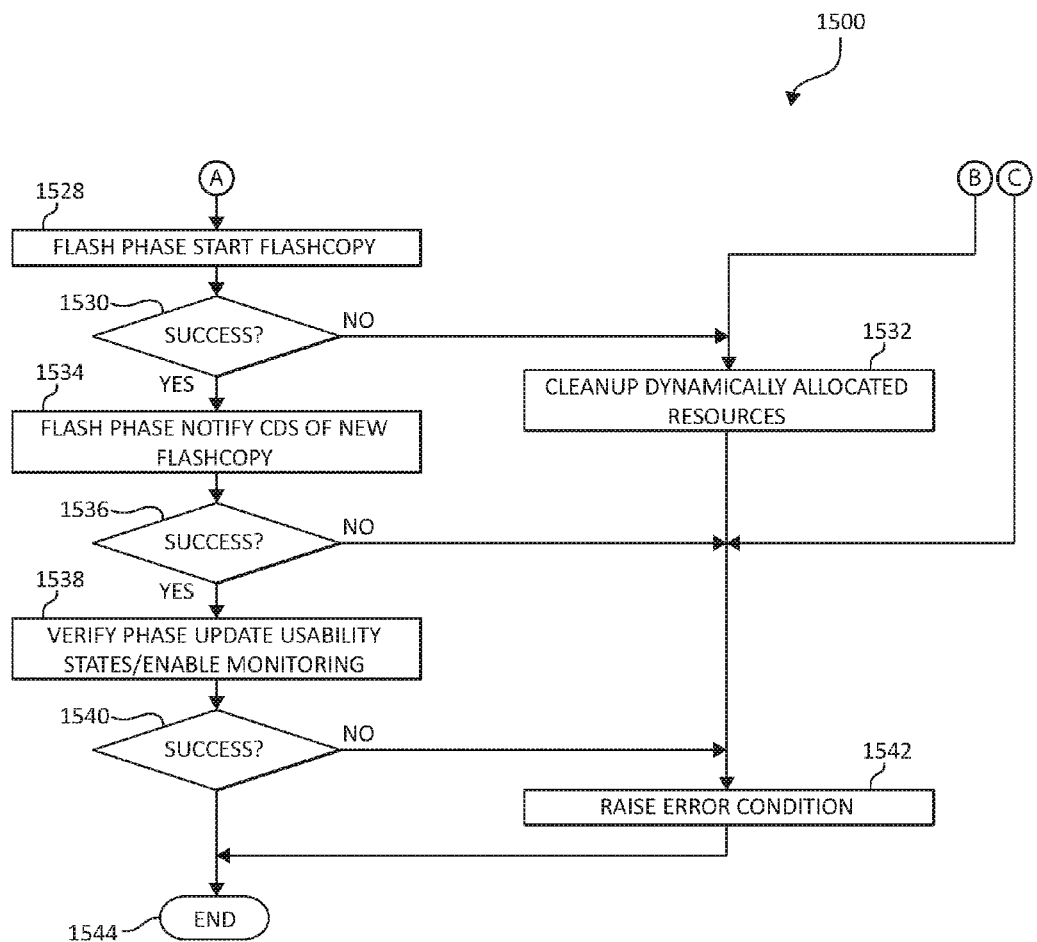

FIG. 15A-B is a flowchart illustrating an additional exemplary method 1500 for efficient FlashCopy backup target volume allocation from a shared resource pool while ingesting a FlashCopy backup in a repository. The method 1500 begins (start 1502) by verifying a state of production target volumes in a partition phase (step 1504). The method 1500 determines if the verification process was a success (step 1506). If no, the method 1500 raises an error condition (step 1542) and then the method 1500 ends (step 1544). If the state of production target volumes is verified, the method 1500 gets or retrieves resources from the global pool of FlashCopy backup target (step 1508). The method 1500 determines if the resources from the global pool of FlashCopy backup target were successfully retrieved (step 1510). If no, than in a prepare phase, the method 1500 dynamically allocates a new space efficient flashcopy target volume(s) (step 1512). In the prepare phase following step 1512, the method 1500 determines if the new space efficient flashcopy target volume was successfully allocated (step 1514). If no, the method 1500 dynamically cleans up any dynamically allocated resources (step 1532), raises an error (step 1542) and ends (step 1544). If yes (from step 1514 and also from step 1510), the method 1500 modifies a consistency group (step 1516).

The method 1500 determines if the consistency group was successfully modified (step 1518). If no, the method 1500 dynamically cleans up any dynamically allocated resources (step 1532), raises an error condition (step 1542) and ends (step 1544). If yes (from step 1518), the method 1500 creates FlashCopy backup mappings (step 1520). The method 1500 determines if the FlashCopy backup mappings were created (step 1522). If no, the method 1500 dynamically cleans up any dynamically allocated resources (step 1532), raises an error condition (step 1542) and ends (step 1544). If yes (from step 1522), the method 1500 initializes a consistency group (e.g., a pre-start) (step 1524). The method 1500 determines if the consistency group was successfully initialized (step 1526). If no, the method 1500 dynamically cleans up any dynamically allocated resources (step 1532), raises an error condition (step 1542) and ends (step 1544). If yes (from step 1526), the method 1500 starts a FlashCopy backup (in a Flash phase) (step 1528). The method 1500 determines if the FlashCopy backup was successfully started (step 1530). If no, the method 1500 dynamically cleans up any dynamically allocated resources (step 1532). From step 1532, method 1500 raises an error condition (step 1544) and then the method 1500 ends (step 1546).

If yes (from step 1530), the method 1500, in the flash phase, notifies a copy data services (CDS) of the new space efficient flashcopy backup (step 1534). The method 1500 determines if the CDS was successfully notified of the new space efficient flashcopy backup (step 1536). If no, the method 1500 raises an error condition (step 1542) and then the method 1500 ends (step 1543). If yes (from step 1536), the method 1500, in a verify/verification phase, updates the usability of states of the space efficient flashcopy backups and/or enables monitoring of the states and/or existing space efficient flashcopy backup target volumes (step 1538). The method 1500 determines if the usability of states of the existing space efficient flashcopy backups was successfully updated and/or the monitoring of the states and/or existing space efficient flashcopy backup target volumes was successfully enabled (step 1540). If no, the method 1500 raises an error condition (step 1542). The method 1500 ends (step 1544). In addition, after a backup residing on a PIT is ingested into the repository, the vdisks and consistency groups, on which the original backup resided, may be returned to the shared pool for future use.

In one embodiment, the present invention provides a solution for dynamically allocating a new FlashCopy target volumes for new FlashCopy backup tasks to avoid the collision that can occur when reusing existing FlashCopy target volumes as described above. This enables significant usability enhancements allowing the computing system to continue to ingest existing FlashCopy backups residing on target volumes unimpeded. It also allows the customer to meet their backups window/RPO.

During Flashcopy/snapshot backup, new volumes and flashcopy maps are always allocated, thus avoiding collision reusing the same target vdisk that is also being ingested into the repository as described herein.

Figure 16A:
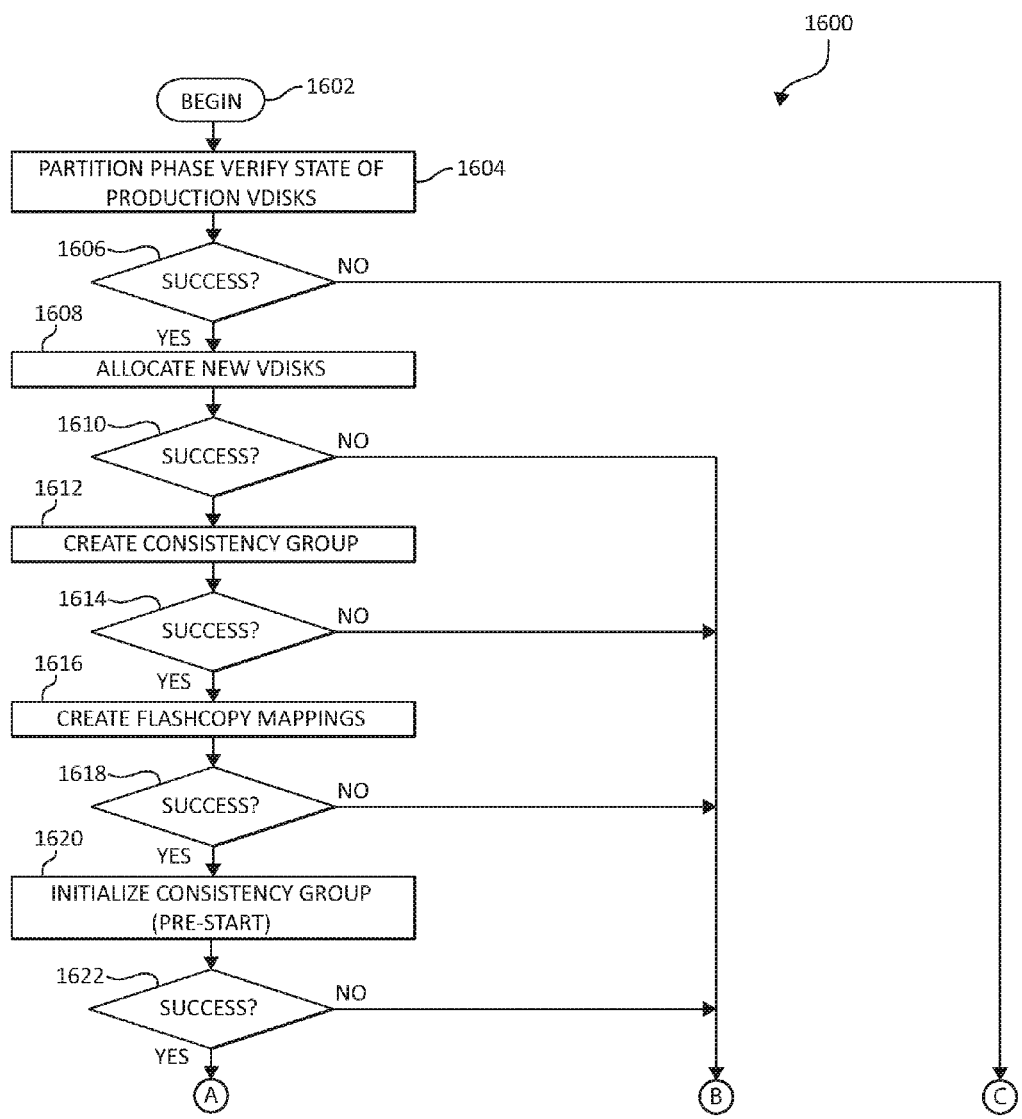
FIG. 16A-B is a flowchart illustrating an additional exemplary method for efficient FlashCopy backup target volume allocation in which aspects of the present invention may be realized.
Figure 16B:
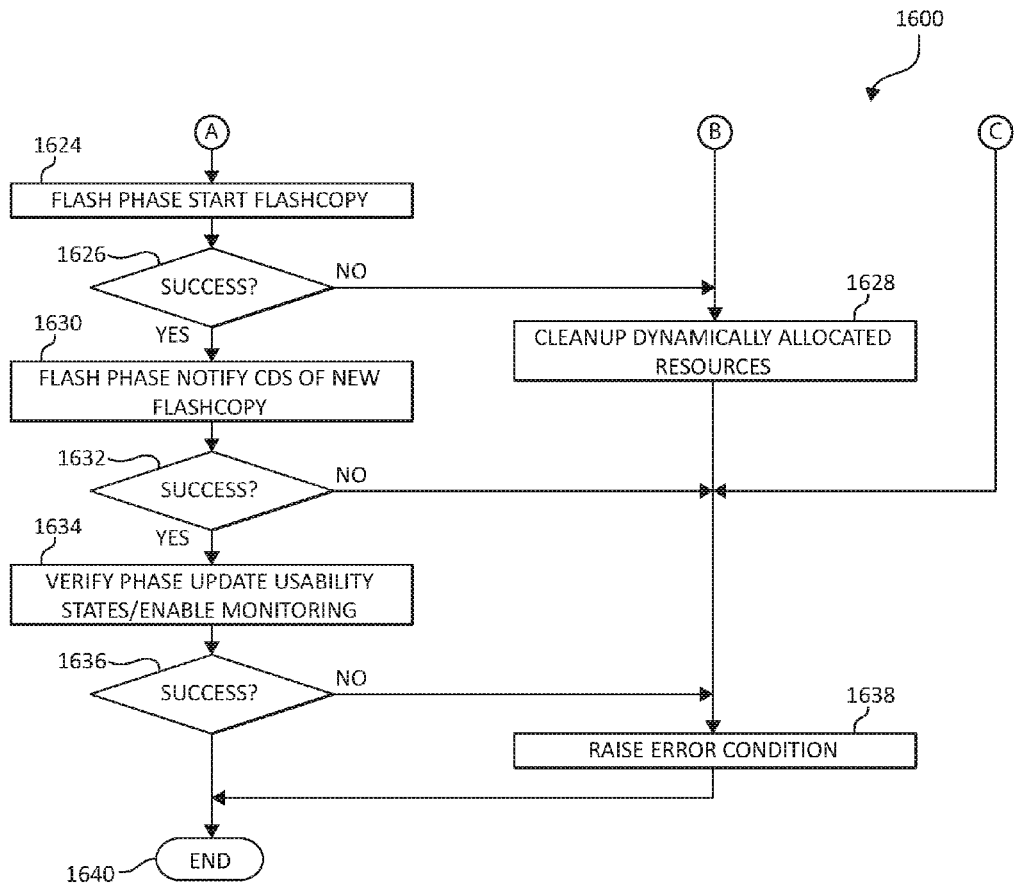

FIG. 16A-B is a flowchart illustrating an additional exemplary method 1600 for efficient FlashCopy backup target volume allocation. Also, the method 1600 illustrates efficient FlashCopy backup target volume allocation while ingesting a FlashCopy backup in a repository. The method 1600 begins (start 1602) by verifying a state of production target volumes in a partition phase (step 1604). The method 1600 determines if the verification process was a success (step 1606). If no, the method 1600 raises an error condition (step 1638) and ends (step (1640). If yes, than in a prepare phase, the method 1600 dynamically allocates a new space efficient flashcopy target volume(s) (step 1608). In the prepare phase following step 1608, the method 1600 determines if the new space efficient flashcopy target volume was successfully allocated (step 1610). If no, the method 1600 dynamically cleans up any dynamically allocated resources (step 1628). From step 1628, method 1600 raises an error condition (step 1638) and then the method 1600 ends (step 1640).

If yes (from step 1610), the method 1600 creates a consistency group (step 1612). The method 1600 determines if the consistency group was successfully created (step 1614). If no, the method 1600 dynamically cleans up any dynamically allocated resources (step 1628), raises an error (step 1638) and ends (step 1640). If yes (from step 1614), the method 1600 creates FlashCopy backup mappings (step 1616). The method 1600 determines if the FlashCopy backup mappings were successfully created (step 1618). If no, the method 1600 dynamically cleans up any dynamically allocated resources (step 1628), raises an error (step 1638) and ends (step 1640). If yes (from step 1618), the method 1600 initializes a consistency group (e.g., a pre-start) (step 1620). The method 1600 determines if the consistency group was successfully initialized (step 1622). If no, the method 1600 dynamically cleans up any dynamically allocated resources (step 1628), raises an error (step 1638) and ends (step 1640).

If yes (from step 1622), the method 1600 starts a FlashCopy backup (in a Flash phase) (step 1624). The method 1600 determines if the FlashCopy backup was successfully started (step 1626). If no, the method 1600 dynamically cleans up any dynamically allocated resources (step 1628), raises an error (step 1638) and ends (step 1640).

If yes (from step 1626), the method 1600, in the flash phase, notifies a copy data services (CDS) of the new space efficient flashcopy backup (step 1630). The method 1600 determines if the CDS was successfully notified of the new space efficient flashcopy backup (step 1632). If no, the method 1600 raises an error condition (step 1638) and then the method 1600 ends (step 1640).

If yes (from step 1632), the method 1600, in a verify/verification phase, updates the usability of states of the space efficient flashcopy backups and/or enables monitoring of the states and/or existing space efficient flashcopy backup target volumes (step 1634). The method 1600 determines if the usability of states of the existing space efficient flashcopy backups was successfully updated and/or the monitoring of the states and/or existing space efficient flashcopy backup target volumes was successfully enabled (step 1636). If no, the method 1600 raises an error condition (step 1638). From step 1638 and 1636, the method 1600 ends (step 1640).

After the Flashcopy backups are ingested into the repository, the FlashCopy mappings, the consistency group, and target volumes (e.g., target vdisks) where the backup originally resided are deleted by the FlashCopy Manager (FCM). For example, referring to T0 as illustrated in FIG. 10, after the backup residing on T0 is ingested into the repository, the FCM deletes the resources for T0.

Figure 17:
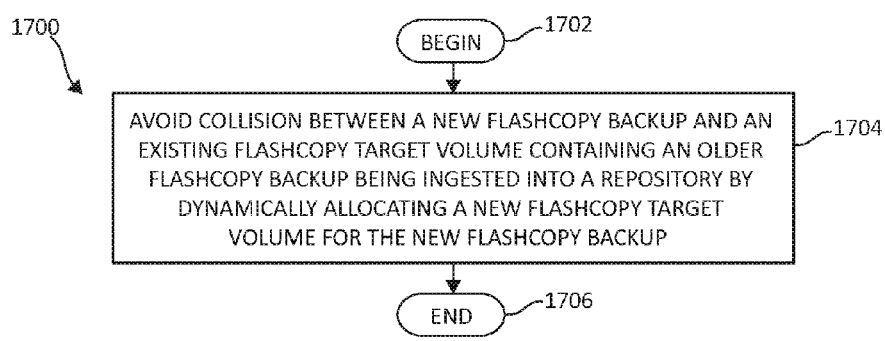
FIG. 17 is a flowchart illustrating an exemplary method for efficient FlashCopy backup target volume allocation while ingesting a FlashCopy backup using a processor device in a computing environment.

FIG. 17 is a flowchart illustrating an exemplary method 1700 for efficient FlashCopy backup target volume allocation while ingesting a FlashCopy backup using a processor device in a computing environment. The method 1700 begins (step 1702) by avoiding collision between a new FlashCopy backup and an existing FlashCopy target volume containing an older FlashCopy backup being ingested into a repository by dynamically allocating a new FlashCopy target volume for the new FlashCopy backup (step 1704). The method 1700 ends (step 1706).

In one embodiment, provided for marking a Flashcopy backup using a processor device in a computing environment. In one embodiment, by way of example only, upon an indication that a Flashcopy backup is not to be ingested, ingesting changed grains and a Flashcopy Map (Fcmap) of the Flashcopy backup or alternatively just the Flashcopy Map (Fcmap) of the Flashcopy backup into a repository and dynamically marking the Flashcopy backup for collapse from a first repository into one of a multiplicity of repositories without breaking a flashcopy chain. The collapse may be performed immediately upon ingest or it may be performed asynchronously. The first repository may entail a pool containing a Flashcopy dependency chain or a Flashcopy cascade.

As mentioned previously, a copy of the production volume at any point in time can be recreated nearly instantly from a first or one of a multiplicity of repositories. Customers may also mount a snapshot backup and use a TSM client to offload the data to TSM server attached storage for longer-term retention. However, a challenge is presented when a new target volume to be mounted to a host gets inserted into the chain downstream from the point in time that the user requests. The new volume creates an unstable map downstream which can prevent ingest of backup PITs. Thus, the present invention provides a solution for creating a stable Flashcopy Map (fcmaps) for ingest.

Figure 18:
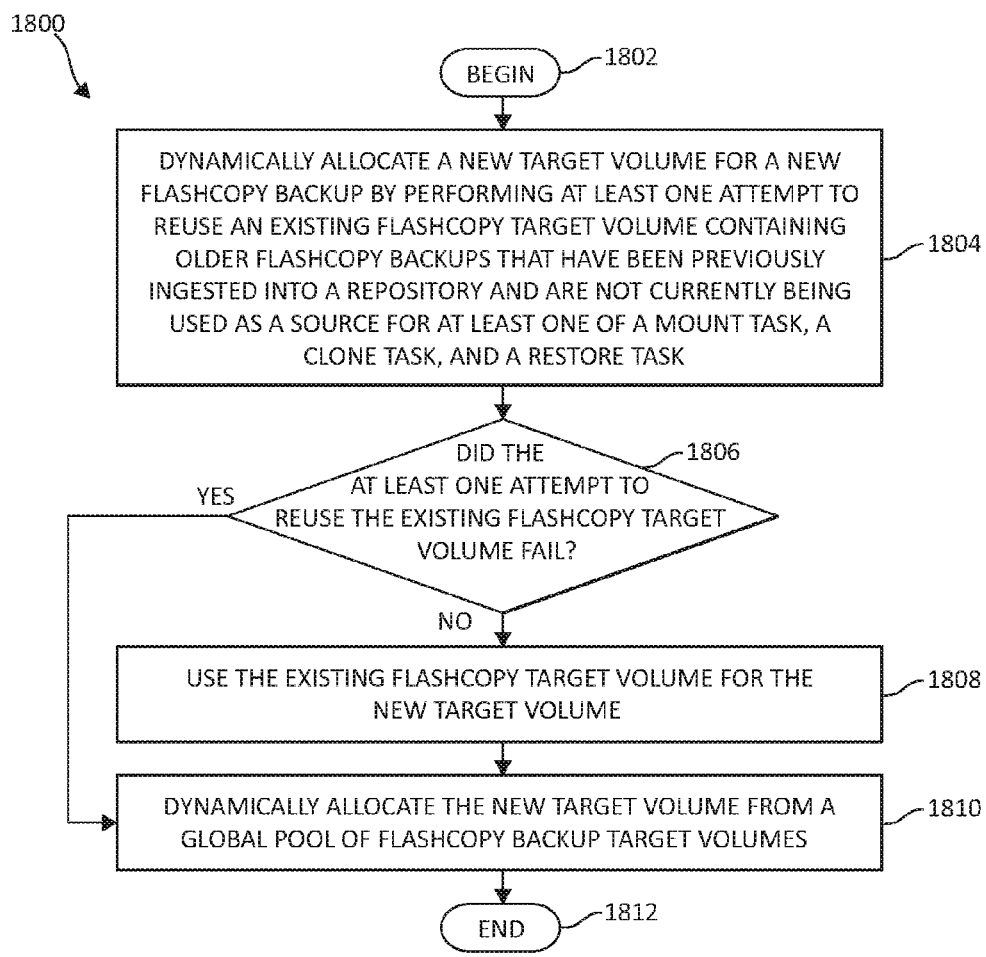
FIG. 18 is a flowchart illustrating an exemplary method for efficient FlashCopy backup target volume allocation.

FIG. 18 is a flowchart illustrating an exemplary method 1800 for efficient FlashCopy backup target volume allocation with reuse and a shared resource pool using a processor device in a computing environment. The method 1800 begins (step 1802) dynamically allocating a new target volume for a new FlashCopy backup by performing at least one attempt to reuse an existing FlashCopy target volume containing older FlashCopy backups that have been previously ingested into a repository and are not currently being used as a source for at least one of a mount task, a clone task, and a restore task (step 1804). The method 1800 determines if the at least one attempt to reuse the existing FlashCopy target volume failed (step 1806). A predefined threshold may be configured for defining the number of attempts for attempting to reuse the existing FlashCopy target volume prior to dynamically allocating the new target volume from the global pool of FlashCopy backup target volumes. For example, a predetermined time period may be defined and set and/or a predetermined number of attempts may be defined in conjunction with and/or as an alternative to the predetermined time period.

If no, the existing FlashCopy target volume is used for the new target volume (step 1808). If yes, the method 1800 dynamically allocates the new target volume from a global pool of FlashCopy backup target volumes (step 1810). The method 1800 ends (step 1812).

In one embodiment, the present invention provides a solution for efficient Flashcopy backup target volume allocation using a processor device in a computing environment. In one embodiment, by way of example only, a target volume is dynamically allocated for a new Flashcopy backup by reusing an existing Flashcopy target volume containing older Flashcopy backups that have been previously ingested into a repository and are not currently being used as a source for at least one of a mount task, a clone task, and a restore task.

In one embodiment, provided for marking a Flashcopy backup using a processor device in a computing environment. In one embodiment, by way of example only, upon an indication that a Flashcopy backup is not to be ingested, ingesting only a Flashcopy Map (Fcmap) of the Flashcopy backup into a repository and dynamically marking the Flashcopy backup for collapse from a first repository into one of a multiplicity of repositories without breaking a flashcopy chain. The collapse may be performed immediately upon ingest or it may be performed asynchronously. The first repository may entail a pool containing a Flashcopy dependency chain or a Flashcopy cascade.

In one embodiment, the present invention determines whether the older Flashcopy backups are currently being ingested into the repository and are currently being used as the source for at least one of the mount task, the clone task, and the restore task.

In one embodiment, the present invention dynamically allocates a new target volume for the new Flashcopy backup. In one embodiment, the present invention dynamically allocates the new target volume for the new Flashcopy backup if the existing Flashcopy target volume contains the older Flashcopy backups that are currently being ingested into the repository and are currently being used as the source for at least one of the mount task, the clone task, and the restore task.

In one embodiment, the present invention performs all or only a selected few of the following elements: dynamically creating the new target volume for the new Flashcopy backup in a pool of existing Flashcopy target volumes, dynamically allocating the new target volume for a next new Flashcopy backup from the pool of the existing Flashcopy target volumes, dynamically allocating the new target volume for the Flashcopy backup from the pool of the existing Flashcopy target volumes while simultaneously ingesting into a repository the existing Flashcopy target volume containing the older Flashcopy backups.

In one embodiment, the present invention creates or deletes a mapping of all Flashcopy backups.

In one embodiment, the present invention provides a solution for efficient Flashcopy backup target volume allocation from a shared resource pool while ingesting a Flashcopy backup in a repository using a processor device in a computing environment. In one embodiment, by way of example only, a global pool of Flashcopy backup target volumes and a consistency group in the global pool of Flashcopy backup target volumes is maintained for use by a new Flashcopy backup upon encountering a collision while an existing Flashcopy target volume containing older Flashcopy backups are being ingested into the repository for dynamically allocating a target volume for the new Flashcopy backup.

In one embodiment, the present invention creates the consistency group in the global pool of Flashcopy backup target volumes.

In one embodiment, the present invention retrieves the target volume and the consistency group from the global pool of Flashcopy backup target volumes for dynamically allocating the target volume for the new Flashcopy backup.

In one embodiment, the present invention creates and/or modifies a mapping of the Flashcopy backup.

In one embodiment, the present invention notifies a copy data services (CDS) of a new space efficient flashcopy backup.

In one embodiment, the present invention provides a solution for efficient Flashcopy backup target volume allocation while ingesting a Flashcopy backup using a processor device in a computing environment. In one embodiment, by way of example only, the present invention avoids collision between a new Flashcopy backup and an existing Flashcopy target volume containing an older Flashcopy backup being ingested into a repository by dynamically allocating a new Flashcopy target volume for the new Flashcopy backup.

In one embodiment, the present invention continuously ingests the Flashcopy backup on the an existing Flashcopy target volume into the repository while dynamically allocating the new Flashcopy target volume for the new Flashcopy backup.

In one embodiment, the present invention dynamically allocates the new Flashcopy target volume and a Flashcopy map.

In one embodiment, the present invention creates a consistency group and the Flashcopy map, and/or deletes the consistency group, the Flashcopy map, and/or the existing Flashcopy target volume containing the older Flashcopy backup after the older Flashcopy backups are ingested into the repository.

In one embodiment, the present invention provides a solution creating a stable Flashcopy Map (fcmaps) for ingest by dynamically allocating a new target volume and a Flashcopy map (fcmap) for ingest upon one of a mount operation, instant restore operation, file level restore operation, and/or a clone operation breaking a FlashCopy chain.

In one embodiment, the present invention performs at least one of dynamically inserting the new target volume for the mount operation into the Flashcopy chain, and/or synchronously ingesting the fcmap prior to dynamically inserting the new target volume for the mount, clone, instant restore, and/or file level restore operation into the Flashcopy chain.

In one embodiment, the present invention provides multiple independent read and write copies of point-in-time (PIT) backups from a pool of storage volume controllers (SVC) for the mount operation.

In one embodiment, the present invention performs at least one of requesting permission for the mount, clone, instant restore, or file level restore operation, and/or synchronously ingesting the fcmap prior to dynamically allocating the mount, clone, instant restore, or file level restore operation upon receiving a request for the new target volume for the mount operation if the new Flashcopy backup being ingested is behind in time from a PIT backup, wherein the fcmap is stable and not changing.

In one embodiment, the present invention dynamically allocates a new target volume and a Flashcopy map (fcmap) for ingest upon one of a mount operation and a clone operation breaking a FlashCopy chain. The present invention dynamically creates the new target volume for the new Flashcopy backup using a pool of existing Flashcopy target volumes.

In one embodiment, the present invention performs at least one of creating an fcmap for the mount operation, preparing and starting a consistency group for the mount operation, and/or creating a host mapping for the mount operation.

In one embodiment, the present invention prohibits the new target volume from being removed from the Flashcopy chain until the PIT backup, which is ahead in time from the new target volume, is fully ingested into the repository.

In one embodiment, the present invention provides a solution for efficient repository ingest of a target volume without breaking a Flashcopy chain using a processor device in a computing environment. In one embodiment, by way of example only, a cloned target volume is created by cloning a production volume without breaking a Flashcopy chain for continuing an ingestion of a Flashcopy backup target volume.

In one embodiment, the present invention synchronously ingests the fcmap of the production volume and/or dynamically inserts the cloned target volume into the Flashcopy chain between the production volume and a next target volume.

In one embodiment, the present invention cloning the cloned target volume, wherein a new Flashcopy backup target volume exists and the new Flashcopy backup target volume is empty.

In one embodiment, the present invention performs at least one of ingesting the cloned target volume into the repository for preventing a breaking of the Flashcopy chain, and/or ingesting the new Flashcopy backup target into the repository.

In one embodiment, the present invention marks the cloned target volume for collapse. In one embodiment, the present invention creates an fcmap of the production volume during the clone operation.

In one embodiment, the present invention provides a solution for efficient repository ingest of a target volume without breaking a Flashcopy chain using a processor device in a computing environment. In one embodiment, by way of example only, the method dynamically creates a cloned target volume by cloning a production volume without breaking a Flashcopy chain for continuing an ingestion of a Flashcopy backup target volume.

In one embodiment, the present invention synchronously ingests the fcmap of the production volume.

In one embodiment, the present invention dynamically inserts the cloned target volume into the Flashcopy chain between the production volume and a next target volume, and/or clones the cloned target volume, wherein a new Flashcopy backup target volume exists and the new Flashcopy backup target volume is empty.

In one embodiment, the present invention performs at least one of: ingesting the cloned target volume into the repository for preventing a breaking of the Flashcopy chain, and/or ingesting the new Flashcopy backup target into the repository.

In one embodiment, the present invention marks the cloned target volume for collapse. In one embodiment, the present invention creates a Flashcopy map (fcmap) of the production volume during the clone operation.

In one embodiment, the present invention provides a solution for marking a Flashcopy backup using a processor device in a computing environment. In one embodiment, by way of example only, upon an indication that a Flashcopy backup is not to be ingested, ingesting changed grains and a Flashcopy Map (Fcmap) of the Flashcopy backup into a repository and dynamically marking the Flashcopy backup for collapse from a first repository into a second repository without breaking a flashcopy chain.

In one embodiment, the present invention ingests the fcmap prior to dynamically inserting a next target volume into the repository and/or prevents the collapse of the Flashcopy backup into the secondary repository until the next target volume is ingested into the repository.

In one embodiment, the present invention passes at least one parameter from a Flashcopy manager for a notification as to whether to ingest or not ingest the Flashcopy backup. In one embodiment, the present invention dynamically marks the changed grains and the Flashcopy Map (Fcmap). In one embodiment, the present invention dynamically schedules the Flashcopy backup for the collapse into the secondary repository after the next target volume has been fully ingested into the repository. In one embodiment, the present invention creates a temporary target volume and establishing the fcmap between an original target volume containing the Flashcopy backup and the temporary target volume.

In one embodiment, the present invention, for efficient Flashcopy backup and a mount, clone, or restore task collision avoidance performs at least one attempt to reuse an existing FlashCopy target volume that is not currently being used for at least one of a mount task, a clone task, and a restore task at the same time for a FlashCopy backup. If the at least one attempt to reuse the existing FlashCopy target volume fails, a new Flashcopy target volume for the Flashcopy backup is dynamically allocated.

In one embodiment, the present invention determines whether the existing FlashCopy target volumes are currently being used as a source for at least one of the mount task, the clone task, and the restore task.

In one embodiment, the present invention dynamically allocates a new target volume or reusing the existing FlashCopy target volume whether or not a repository exists.

In one embodiment, the present invention performs the at least one attempt to reuse the existing FlashCopy target volume in a Flashcopy chain of target volumes after the target volumes in the Flashcopy chain have been ingested into a repository.

In one embodiment, the present invention provides a solution for efficient Flashcopy backup and a mount, clone, or restore task collision avoidance using dynamic volume allocation from a shared resource pool using a processor device in a computing environment. In one embodiment, by way of example only, the present invention dynamically uses a Flashcopy target volume for the Flashcopy backup from a global pool of Flashcopy backup target volumes shared by a plurality of device classes for avoiding a collision between the Flashcopy backup and the mount, the clone, or the restore task.

In one embodiment, the present invention provides a solution for efficient Flashcopy backup and a mount, clone, or restore task collision avoidance using dynamic volume allocation with reuse and from a shared resource pool using a processor device in a computing environment. In one embodiment, by way of example only, the method performs at least one attempt to reuse an existing FlashCopy target volume in a Flashcopy chain of target volumes after the target volumes in the Flashcopy chain have been ingested into a repository that is not currently being used for at least one of the mount task, the clone task, and the restore task at the same time for a FlashCopy backup. If the at least one attempt to reuse the existing FlashCopy target volume fails, dynamically allocate a new Flashcopy target volume for the Flashcopy backup from a global pool of Flashcopy backup target volumes shared by a plurality of device classes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient point-in-time copy backup target volume allocation from a shared resource pool while ingesting a point-in-time copy backup in a repository by a processor device in a computing environment, the method comprising:
    maintaining a global pool of point-in-time copy backup target volumes for use by a new point-in-time copy backup upon encountering a collision while an existing point-in-time copy target volume containing older point-in-time copy backups are being ingested into a repository for dynamically allocating a target volume for the new point-in-time copy backup.

2. The method of claim 1, further including determining whether production volumes exist from which the new point-in-time copy backup is created.

3. The method of claim 2, further including creating at least one of a consistency group and a point-in-time copy map in the global pool of point-in-time copy backup target volumes.

4. The method of claim 3, further including retrieving at least one of a target volume and a consistency group from the global pool of point-in-time copy backup target volumes for dynamically allocating the target volume for the new point-in-time copy backup.

5. The method of claim 4, further including creating or modifying a mapping of the point-in-time copy backup.

6. The method of claim 5, further including performing at least one of:
    dynamically creating the target volume for the new point-in-time copy backup in the global pool of point-in-time copy backup target volumes,
    dynamically allocating the target volume for a next new point-in-time copy backup from the global pool of point-in-time copy backup target volumes,
    dynamically allocating a target volume for the new point-in-time copy backup by reusing an existing point-in-time copy target volume containing older point-in-time copy backups that have been previously ingested into a repository and are not currently being used as a source for at least one of a mount task, a clone task, and a restore task, and
    dynamically allocating new target volume for the new point-in-time copy backup from the global pool of point-in-time copy backup target volumes while simultaneously ingesting into the repository the existing point-in-time copy target volume containing older point-in-time copy backups.

7. A system for efficient point-in-time copy backup target volume allocation from a shared resource pool while ingesting a point-in-time copy backup in a repository in a computing environment, the system comprising:
    at least one processor device operable in the computing storage environment, wherein processor device:
        maintains a global pool of point-in-time copy backup target volumes for use by a new point-in-time copy backup upon encountering a collision while an existing point-in-time copy target volume containing older point-in-time copy backups are being ingested into a repository for dynamically allocating a target volume for the new point-in-time copy backup.

8. The system of claim 7, wherein the at least one processor device determines whether production volumes exist from which the new point-in-time copy backup is created.

9. The system of claim 8, wherein the at least one processor device creates at least one of a consistency group and a point-in-time copy map in the global pool of point-in-time copy backup target volumes.

10. The system of claim 9, wherein the at least one processor device retrieves at least one of a target volume and a consistency group from the global pool of point-in-time copy backup target volumes for dynamically allocating the target volume for the new point-in-time copy backup.

11. The system of claim 10, wherein the at least one processor device creates or modifies a mapping of the point-in-time copy backup.

12. The system of claim 11, wherein the at least one processor device performs at least one of:
   dynamically creating the target volume for the new point-in-time copy backup in the global pool of point-in-time copy backup target volumes,
   dynamically allocating the target volume for a next new point-in-time copy backup from the global pool of point-in-time copy backup target volumes,
   dynamically allocating a target volume for the new point-in-time copy backup by reusing an existing point-in-time copy target volume containing older point-in-time copy backups that have been previously ingested into a repository and are not currently being used as a source for at least one of a mount task, a clone task, and a restore task, and
   dynamically allocating new target volume for the new point-in-time copy backup from the global pool of point-in-time copy backup target volumes while simultaneously ingesting into the repository the existing point-in-time copy target volume containing older point-in-time copy backups.

13. A computer program product for efficient point-in-time copy backup target volume allocation from a shared resource pool while ingesting a point-in-time copy backup in a repository in a computing environment by a processor device, the computer program product comprising a non-transitory computer-readable storage medium having computer-readable program code portions stored therein, the computer-readable program code portions comprising:
   a first executable portion that maintains a global pool of point-in-time copy backup target volumes for use by a new point-in-time copy backup upon encountering a collision while an existing point-in-time copy target volume containing older point-in-time copy backups are being ingested into a repository for dynamically allocating a target volume for the new point-in-time copy backup.

14. The computer program product of claim 13, further including a second executable portion that determines whether production volumes exist from which the new point-in-time copy backup is created.

15. The computer program product of claim 14, further including a third executable portion that creates at least one of a consistency group and a point-in-time copy map in the global pool of point-in-time copy backup target volumes.

16. The computer program product of claim 15, further including a fourth executable portion that performs at least one of:
   retrieving at least one of a target volume and a consistency group from the global pool of point-in-time copy backup target volumes for dynamically allocating the target volume for the new point-in-time copy backup, and
   creating or modifying a mapping of the point-in-time copy backup.

17. The computer program product of claim 16, further including a sixth executable portion that performs at least one of:
   dynamically creating the target volume for the new point-in-time copy backup in the global pool of point-in-time copy backup target volumes,
   dynamically allocating the target volume for a next new point-in-time copy backup from the global pool of point-in-time copy backup target volumes,
   dynamically allocating a target volume for the new point-in-time copy backup by reusing an existing point-in-time copy target volume containing older point-in-time copy backups that have been previously ingested into a repository and are not currently being used as a source for at least one of a mount task, a clone task, and a restore task, and
   dynamically allocating new target volume for the new point-in-time copy backup from the global pool of point-in-time copy backup target volumes while simultaneously ingesting into the repository the existing point-in-time copy target volume containing older point-in-time copy backups.

\* \* \* \* \*